United States Patent [19]
Zuck

[11] Patent Number: 4,813,634
[45] Date of Patent: Mar. 21, 1989

[54] FLYING EMERGENCY EJECTION SEAT

[76] Inventor: Daniel R. Zuck, 14273 Beaver St., Sylmar, Calif. 91342

[21] Appl. No.: 114,440

[22] Filed: Sep. 21, 1987

Related U.S. Application Data

[63] Continuation-in-part of Ser. No. 567,938, Jan. 5, 1985, abandoned, and a continuation-in-part of Ser. No. 797,397, Nov. 12, 1985, abandoned.

[51] Int. Cl.⁴ .............................................. B64D 25/08
[52] U.S. Cl. .................................. 244/122 A; 244/49; 244/89; 244/140; 244/4 A
[58] Field of Search .............. 244/4 R, 4 A, 140, 122, 244/49, 218, 56, 55, 89, 120, 2

[56] References Cited

U.S. PATENT DOCUMENTS

| | | | |
|---|---|---|---|
| 3,173,629 | 3/1965 | Uhor | 244/4 A |
| 3,329,464 | 7/1967 | Barwood et al. | 244/122 B |
| 3,666,210 | 5/1972 | Look et al. | 244/218 |
| 3,679,157 | 7/1972 | Roberts et al. | 244/122 A |
| 3,862,731 | 1/1975 | McIntyre | 244/122 A |
| 3,881,671 | 5/1975 | Bouchnik | 244/140 |
| 3,981,465 | 9/1976 | Sinnett et al. | 244/122 A |
| 3,999,728 | 12/1976 | Zimmer | 244/140 |
| 4,218,035 | 8/1980 | Jordan | 244/122 A |
| 4,379,532 | 4/1983 | Dimitrowsky | 244/4 A |

Primary Examiner—Galen Barefoot

[57] ABSTRACT

A flying emergency ejection seat for endangered airman to escape from distressed aircraft and to fly cross country in the seat to sanctuary of a more favorable environment for recovery having the following existing state-of-the-art non-flying seat survival features of an airman's ejection seat including: a parachute, a rocket/catapult propelled escape seat for ejection, a survival kit for air, land, and water survival equipment, guidance controls on the escape seat and mating guides in the aircraft to direct the path of the seat ejection from the aircraft, seat/man separation device, and added on design features of this invention to make it a flying seat:- shall include add-on folding wings for extension in flight to sustain the seat in flight, add-on extendable empennage for extension during ejection to stabilize and guide the direction of flight of the seat in a prone attitude, add-on actuators on the seat bucket to stretch out the airman into a physical prone head down, face forward configuration for minimum aerodynamic drag, add-on one or more powerplants folded in the headrest when ejected and extended for flight to propel the flying seat horizontally cross country.

19 Claims, 23 Drawing Sheets

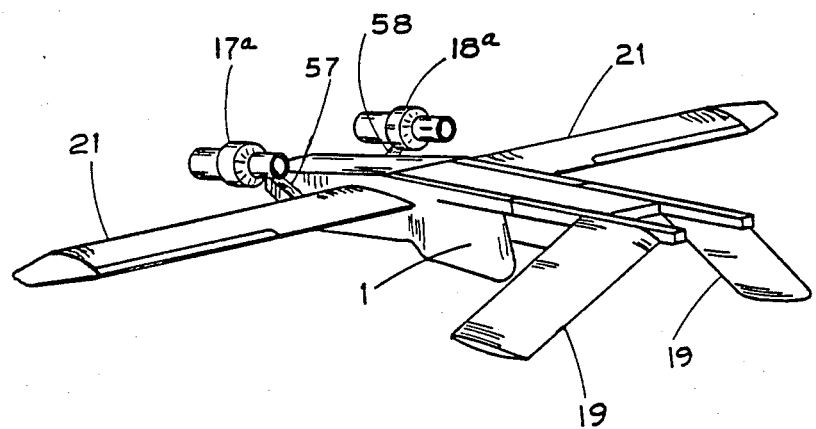
FIG. 11
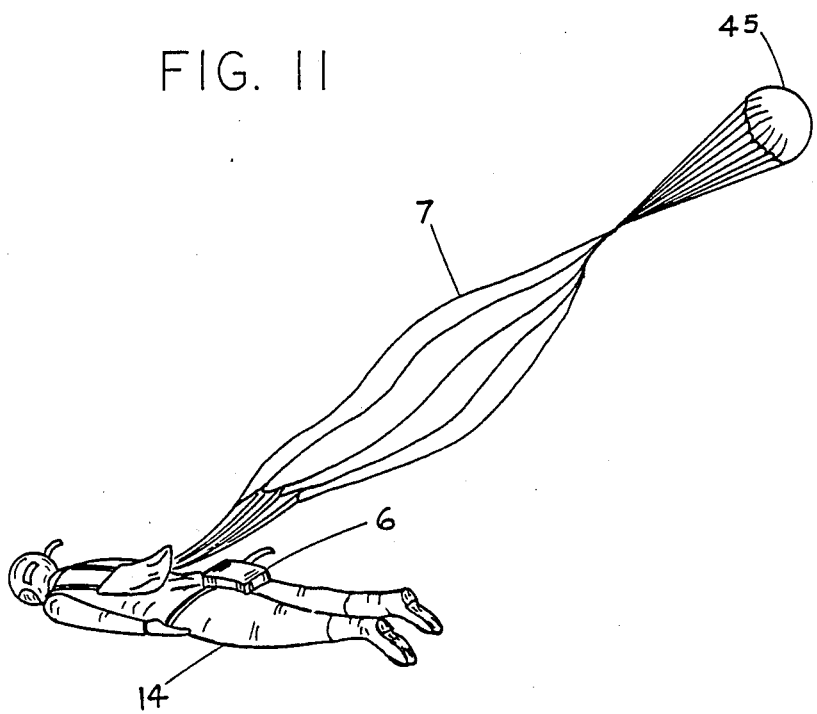
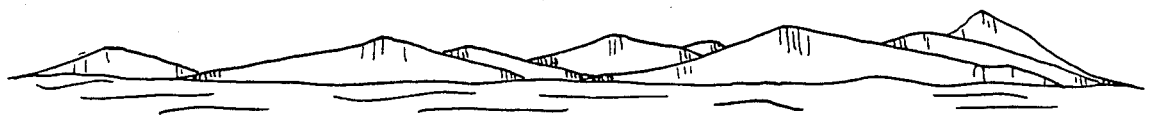
FIG. 12

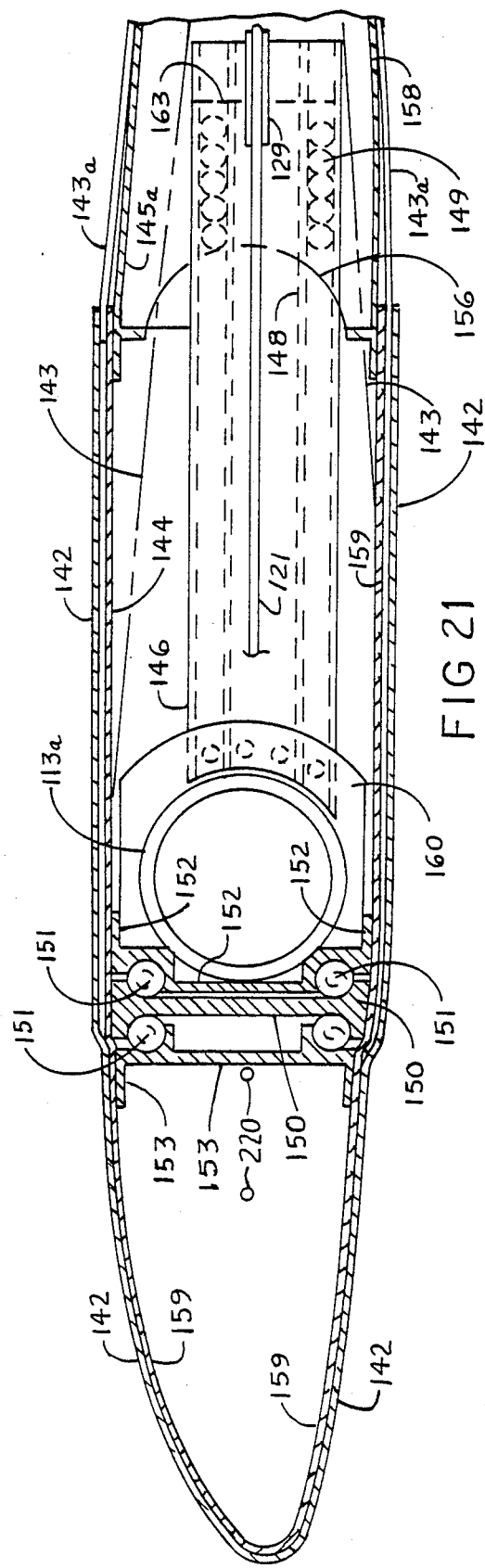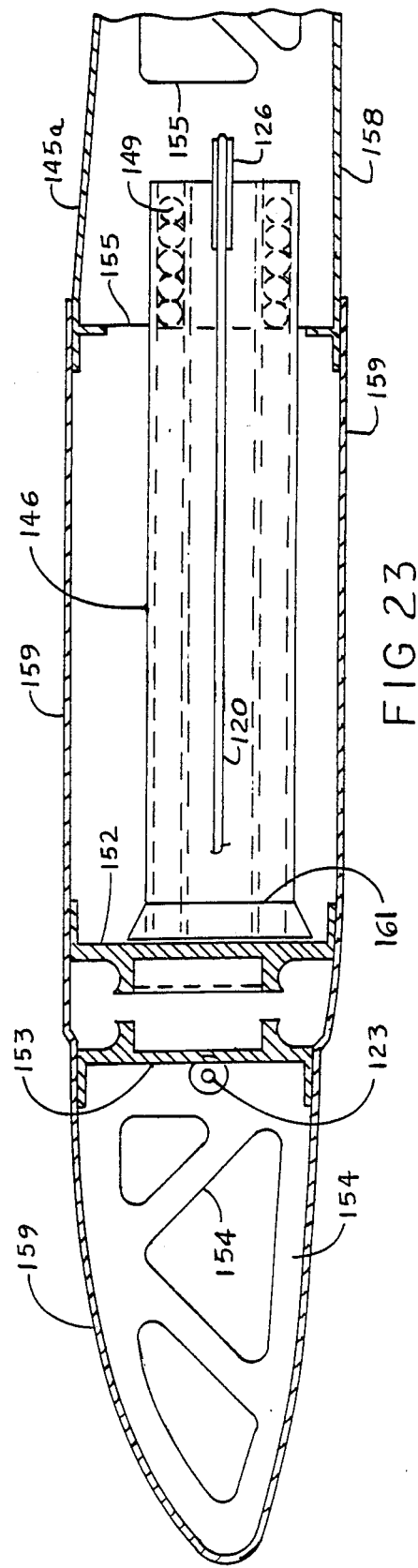

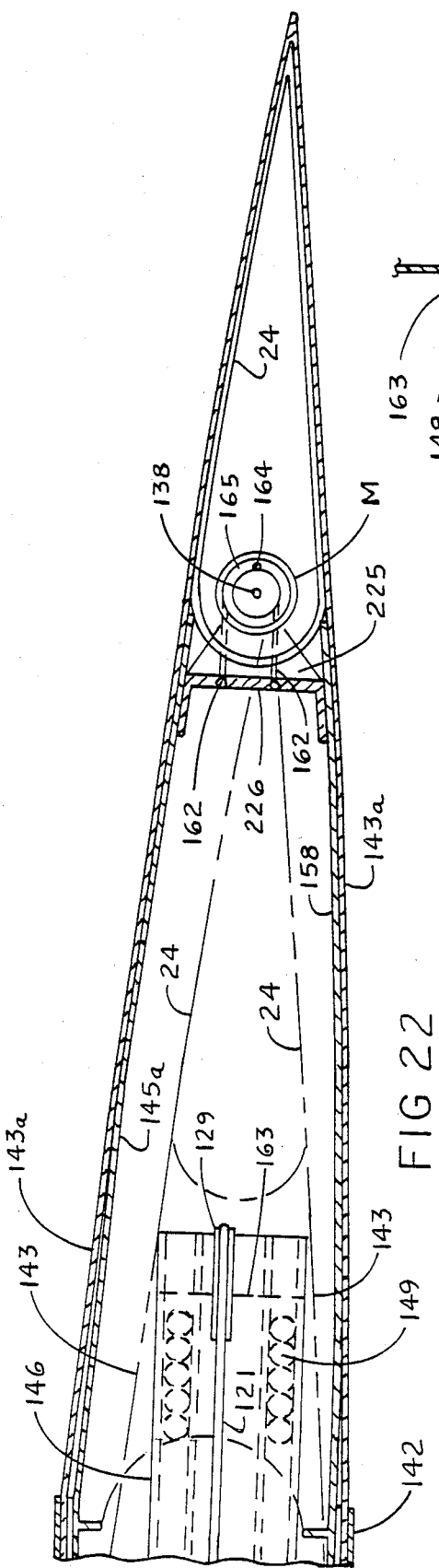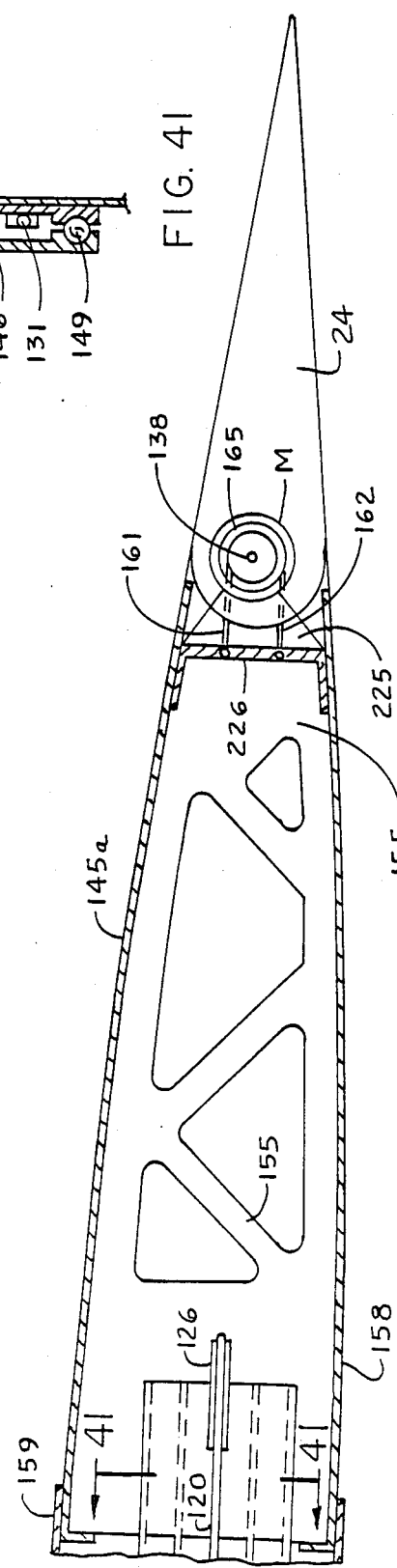

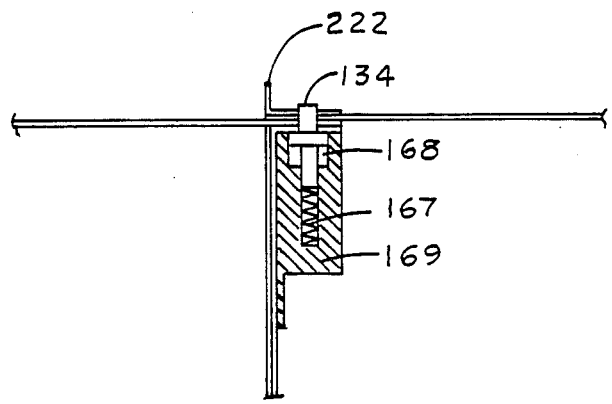
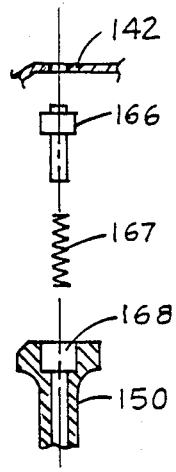
FIG 28
FIG 27
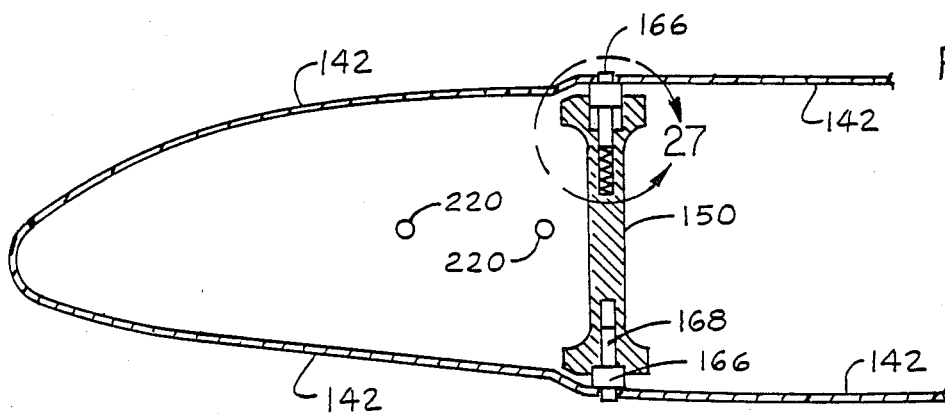
FIG 25
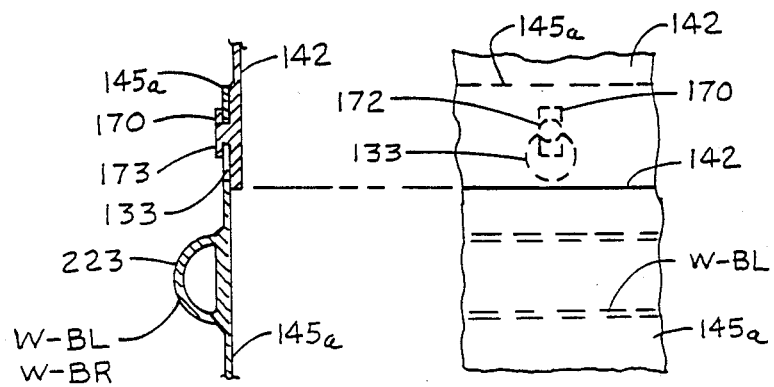
FIG 26

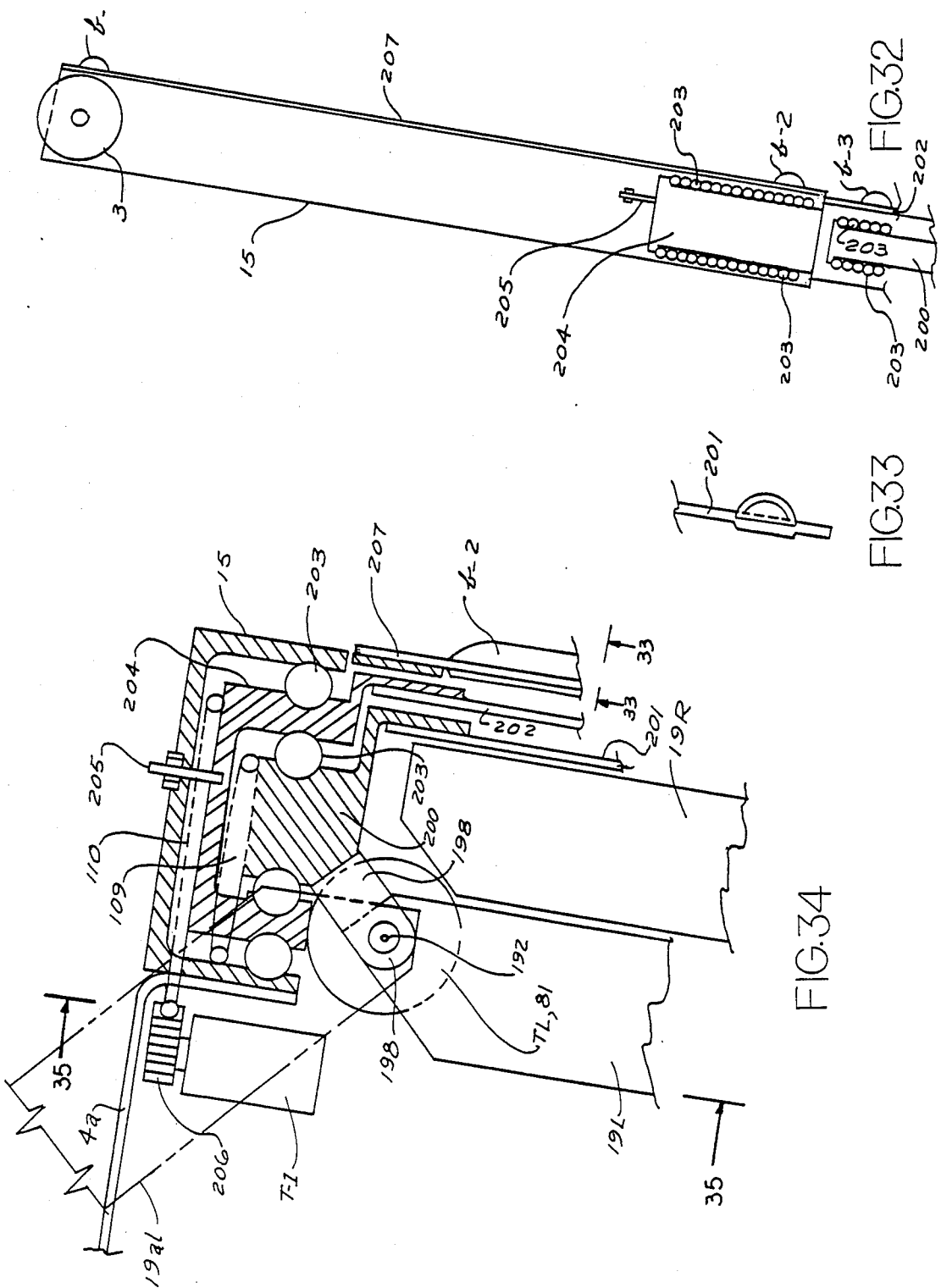

FLYING EMERGENCY EJECTION SEAT

This is a continuation in part of Ser. No. 06/567,938 filed Jan. 5, 1985, now abandoned, and Ser. No. 06/797,397 filed Nov. 12, 1985, now abandoned.

BACKGROUND OF THE INVENTION

The invention relates to emergency escape and survival from potential and imminent aircraft crash situations mostly in military combat aircraft. Escape is accomplished in the prior art with a crewman's aircraft seat ejected from the aircraft by means of a seat-rocket catapult. Following seat ejection, the ejectee crewman separates from the seat immediately and automatically. The ejectee's parachute is then deployed automatically lowering the escapee crewman to the ground safely, often very near the crashed airplane. This capability of the state-of-the-art is retained in this seat adding the flying capability and aerodynamic configuration as an add-on second selective mode feature to the present state-of-the-art seat to be used at selected altitudes above the ground.

This invention is an add-on concept capability to the current highly developed operational survival ejection seat which has zero altitude and zero speed survivable ejection capability combined with high altitude and high speed escape capability. This invention is in two parts comprising two separate patent applications, the first of which is this application disclosing the deployment concept for the currently operational state-of-the-art zero altitude zero speed with high altitude high speed deployment having the add-on concept means of aerodynamic flight configuration.

This application discloses the add-on features and the sequence of deployment of the add-on flight capability comprising the wings, the empennage (tail) and the power plants, including the articulated seat bucket to place the airman in the minimum aerodynamic drag configuration in the prone position with his face downward, his head forward, and complete head to feet body proximately 180 degree stretch-out configuration.

The second patent application discloses and claims the structural details and the actuation and attachment of the folded wings to the seat back, the attachment and deployment of the folded tail and the deployment of the powerplants folded into the head rest, all of which requires a proper weight distribution as taught by this patent disclosure to produce an aerodynamically controllable and viable flying seat. The second patent application discloses the folded and extended mechanical means of the wings, the span and chord extension means of the wings. The second application also discloses the folding and extending means of the tail and folding and extending means for the powerplants including the fuel tanks and manual flight control means. These features are in concept an add-on means and they become integrally designed with the currently operational military seat which is the current state-of-the-art in ejection seats but lacking the flight across country capability which this invention provides.

In military combat it may be undesirable due to enemy action on the ground to land near the downed aircraft. The Vietnam conflict demonstrated that it was very hazardous from the standpoint of being captured for the downed ejectee airman to land near his fallen aircraft. Consequently, a great effort was made to develope an emergency escape system that gave the ejectee crewman an ability to fly from the scene of the plane's accident in his own ejected seat.

The Kaman Company in 1970–1973 developed a prototype seat with such capability, although it seemingly lacked feasibility due to its high aerodynamic drag with the occupant in low speed, low range, complexity, and obvious impractibility. It was also an incomplete system. It lacked zero aircraft speed and zero aircraft altitude survivability, and it lacked water survivability and general overall survivability provided in the current stateof-the-art emergency ejection seats.

Other patents : Roberts U.S. Pat. No. 3,679,157, Bouchnik Moshav U.S. Pat. No. 3,881,671, and Zimmer U.S. Pat. No. 3,999,728 are representative of the current state-of-the-art flying emergency airmen ejection systems. They are unlike this invention's open flying seat. Robert's has a glide down capability only and has no powerplant to sustain flight, and provides no prone occupant attitude with prone head forward, face downward, forward stretch-out seat to reduce aerodynamic drag to increase escape range as does this disclosure. Both Bouchnick's and Zimmer's disclosures are escape capsules using rockets for capsule ejection, and possibly a short burst of thrust to initiate a short glide away from the accident scene. Rockets are not cross-country cruise powerplants. The powerful rockets used are for initial separation of the capsule from the doomed aircraft, similar in function to the rocket used in this invention of the flying seat and for aircraft separation. For sustaining cruise across country this invention uses a fuel economical, low powered jet engine. The above capsule inventions are used only for escape from high speed aircraft in supersonic flight. The above capsules do not provide for across country cruising flight as does this invention.

The teaching of the following references separately or collectively of Uhor U.S. Pat. No. 3,173,620, Barwood U.S. Pat. No. 3,329,464, Look U.S. Pat. No. 3,666,210, Sinnett, et al, U.S. Pat. No. 3,981,465, Jordan U.S. Pat. No. 4,218,035, Dimitrowsky, U.S. Pat. No. 4,379,532, and McIntyre U.S. Pat. No. 3,862,731, do not enable one skilled in the art to conceive, design, or to construct this nationally most urgently needed escape device disclosd by this applicant. The fundamental teaching of the applicant's device is a free-flying, aerodynamically compatible seat with the escapee's seat device prone, head forward, face downward, and body stretched out with the feet supported horizontally aft in a minimum drag configuration for the maximum fuel economy, maximum cross country free-flight range, and for maximum speed. It is an add-on concept device essentially to a state-of-the-art zero altitude, zero speed ejection seat. Nowhere in the above references is that teaching found.

The references all cited above, make no contribution to teaching of the state-of-the art of a combined zero-zero ejection seat with a free-flying cross-country capability in an emergency escape seat having maximum speed, and maximum range which the applicant teaches and which is necessary to flee from the enemy during ejection in combat.

Jordan does not rotate the seat bucket with relation to the back rest. There is no pivotal connection of the seat bucket in Jordan to achieve the applicant's required result. Jordan's pivot 4 is in the top of the seat back rest and suitable only to Jordan for high speed, high acellerating maneuvering aircraft. Jordan requires the seat occupant to recline in a very uncomfortable supine configuration while the occupant conducts his duties in the aircraft. This cannot be comfortably endured for long in any aircraft and is unacceptable in other military aircraft where the applicant's teaching is urgently needed.

Jordan is not a flying seat and teaches nothing useable in a flying seat. During ejection Jordan rotates violently counterclockwise from the catapult thrust and again is violently arrested when the seat-man strikes the catapult only to be destructed by the rocket fire and blast when the seat is parallel with the rocket and then is placed into a fatal anti clockwise spin from the side thrust of the rocket against the seat. The applicant's aerodynamic empennage in the seat bottom of Jordan for the flying the seat with the escapee's head forward, face downward, and feet aft will be completely destroyed by this rocket fire, aside from fatally spinning the seat anti clockwise.

Jordan does not support feet horizontally aft as taught by the applicant. Jordan, as familiar to those skilled in the art, is designed to separate the escapee from the seat immediately after rocket burn-out. Jordan therefore does not need or provide for human body support, head and legs, head forward and face downward with legs stretched aft horizontally as the applicant's device requires.

In FIG. 3 of Jordan upper far right, the rocket segment is well above the buttocks of the ejectee engulfing the feet, legs, and lower body in the rocket flame leaving the lower segments of the telescoping rocket in the abandoned aircraft. Consider the catastrophic, fatal results of Jordan in combination with barwood, et al with Barwood pulling the feet and legs into the rocket flame of Jordan during ejection. The successful sequence of events must follow the applicant's teaching in FIG. 8, positions 36, 38, and 39 after the rocket flame is extinguished.

It is the purpose of this invention to provide an emergency survival seat ejection system with survival capability equivalent to the current art, but having in addition an add-on capability of substantial cross country escape of pilot controlled flight distance and range capability from the scene of the airplane accident. In war time this escape system could have a most sought after advantage providing the escaped airman-ejectee with a means to escape the enemy during descent from a doomed aircraft and on the ground to escape the tell-tail area of the downed aircraft.

OBJECTS AND SUMMARY OF THE INVENTION

It is an object of this invention to provide an improved escape and survival system to escape from dircraft during an impending aircraft crash, and to provide capability of escaping the crash zone by a substantial distance.

It is another object to provide for powered controlled flight by the ejected airman survivor in a flying ejection seat after being catapulted and rocketed from the crashing and doomed aircraft.

It is another object to provide means to make such a flying seat feasible in overall size so that the ejectable seat can be stowed in a military combat aircraft similarily to the ejection seats used in the current state-of-the-art military aircraft with a minimum increase in space-occupied volume when in the aircraft.

It is another object to disclose the extending of the wing span and chord length of a wing to provide adequate lift area for efficient aerodynamic flight in the flying ejection seat.

It is another object to articulate the seat bucket to place the ejected crewman's body in a head forward, face downward, stretched out body configuration for minimum aerodynamic drag, which will result in minimum fuel consumption, maximum range and maximum cruise speed.

It is another object to provide restraint for the crewman's head for comfort during cruise with the body in a horizontal position as well as head restraint protection during high speed ejection or "bail out" as it is often referred to.

Another object is to provide a seat bucket with means to stow the folded empennage surfaces and to extend the empennage aft for tail stabilization of the seat.

It is another object to provide in addition to the current state-of-the-art an ejection seat having parachute survival gear to provide an articulated seat bucket for face downward, head forward positioning of the crewman, a powerplant means, a wing means for flight, and an empennage means for stability of the flying machine.

BRIEF DESCRIPTION OF THE DRAWINGS

FIG. 11 shows the flying seat with the ejectee crewman separated from the seat after the seat has delivered the ejected crewman safely from the accident scene in FIGS. 9, 10, and the ejectee has flown to a friendly land environment in FIG. 12.

FIG. 12 shows the ejected crewman's parachute deploying.

FIG. 21 is an inboard leading edge wing airfoil fragment taken on line 21—21 in FIG. 17.

FIG. 22 is an inboard trailing edge wing airfoil fragment taken on line 22—22 in FIG. 17.

FIG. 23 is an outboard leading edge wing airfoil fragment taken on the line 23—23 in FIG. 20.

FIG. 24 is an outboard trailing edge wing airfoil fragment taken on the line 24—24 in FIG. 20.

FIG. 25 is a section taken on line 25—25 in FIG. 20.

FIG. 26 is a secton taken on line 26—26 in FIG. 20.

FIG. 27 is a detailed explosion of individual parts shown in assembly within the circle in FIG. 25.

FIG. 28 is a section taken on line 28—28 in FIG. 20.

FIG. 32 is a view taken on line 32—32 in FIG. 18.

FIG. 33 is a section taken on line 33—33 in FIG. 19.

FIG. 34 is a section taken on line 34—34 in FIG. 17.

FIG. 40 is an electrical schematic showing the manually functional bank and pitch control of the craft in flight.

FIG. 41 is a schematic of the pyrotechnic release of the escapee from the seat as shown in FIGS. 11 and 12.

DESCRIPTION OF THE PREFERRED SEAT EMBODIMENT AND ITS OPERATION IN AUTOMATIC DEPLOYMENT

Figure 1:
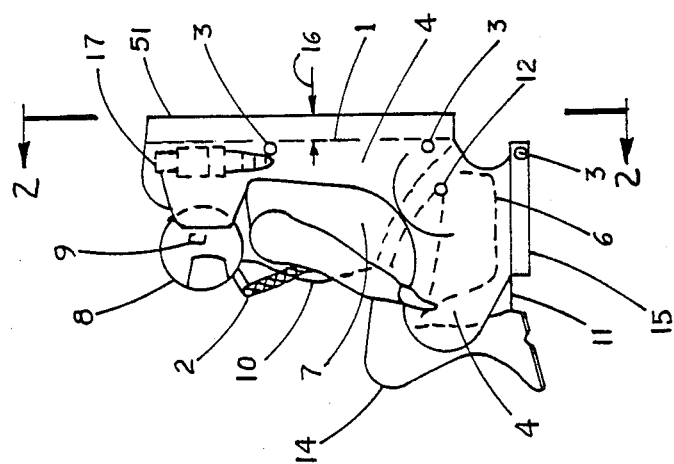
FIG. 1 is a side view schematic of the ejection seat assembly with the crewman ejectee in the seat during the ejection configuration.
Figure 2:
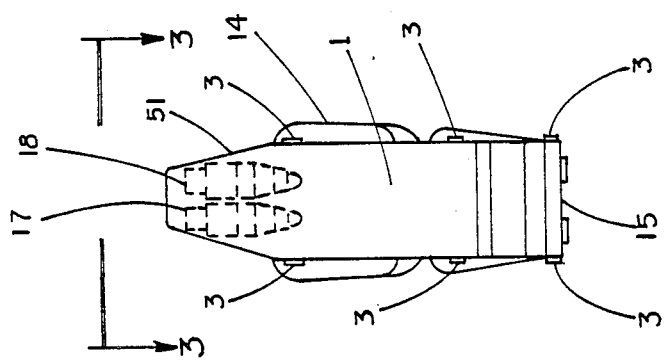
FIG. 2 is a rear view of the seat/man configuration taken on line 2—2 in FIG. 1.

Referring to the drawings there is shown in FIG. 1 an ejectee airman's or aircrews' seat assembly 1 similar to the state-of-the-art military combat ejectable seats with the corresponding items commonly included in the ejectee's survival gear 6 and 7, the survival kit and parachute.

Figure 3:
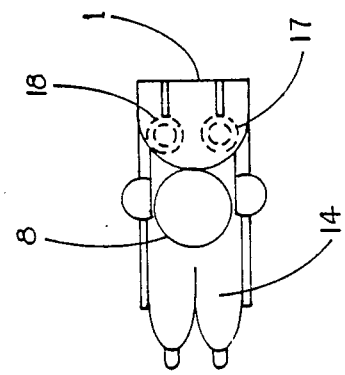
FIG. 3 is the plan view of the seat/man configuration taken on line 3—3 in FIG. 2.
Figure 13:
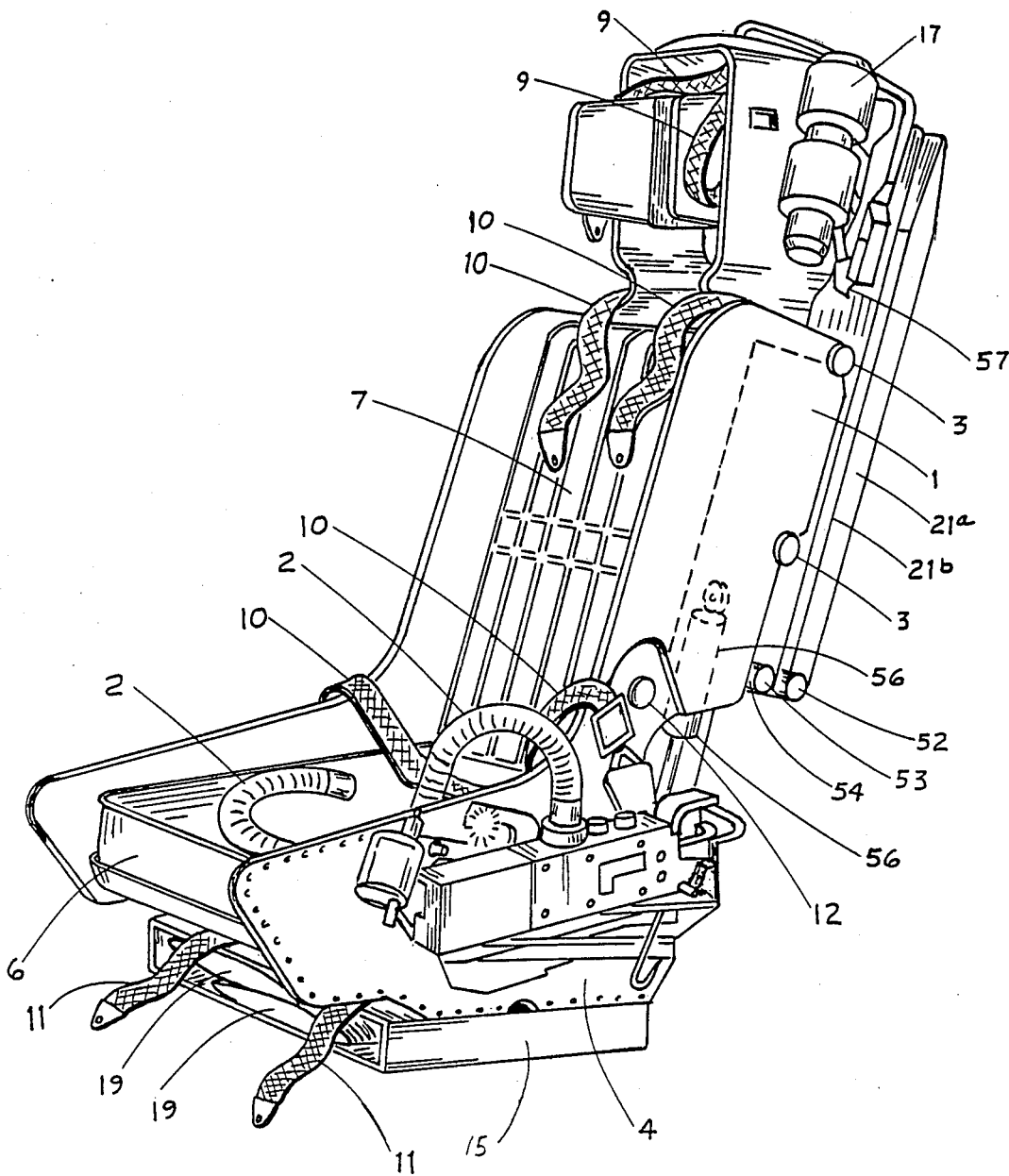
FIG. 13 is a ¾ view of the flying seat showing the wings stowed, empennage stowed, and the powerplants stowed, the seat bucket actuator and the seat bucket. They are this application's add-on devices to the current state-of-the-art ejection seat.
Figure 14:
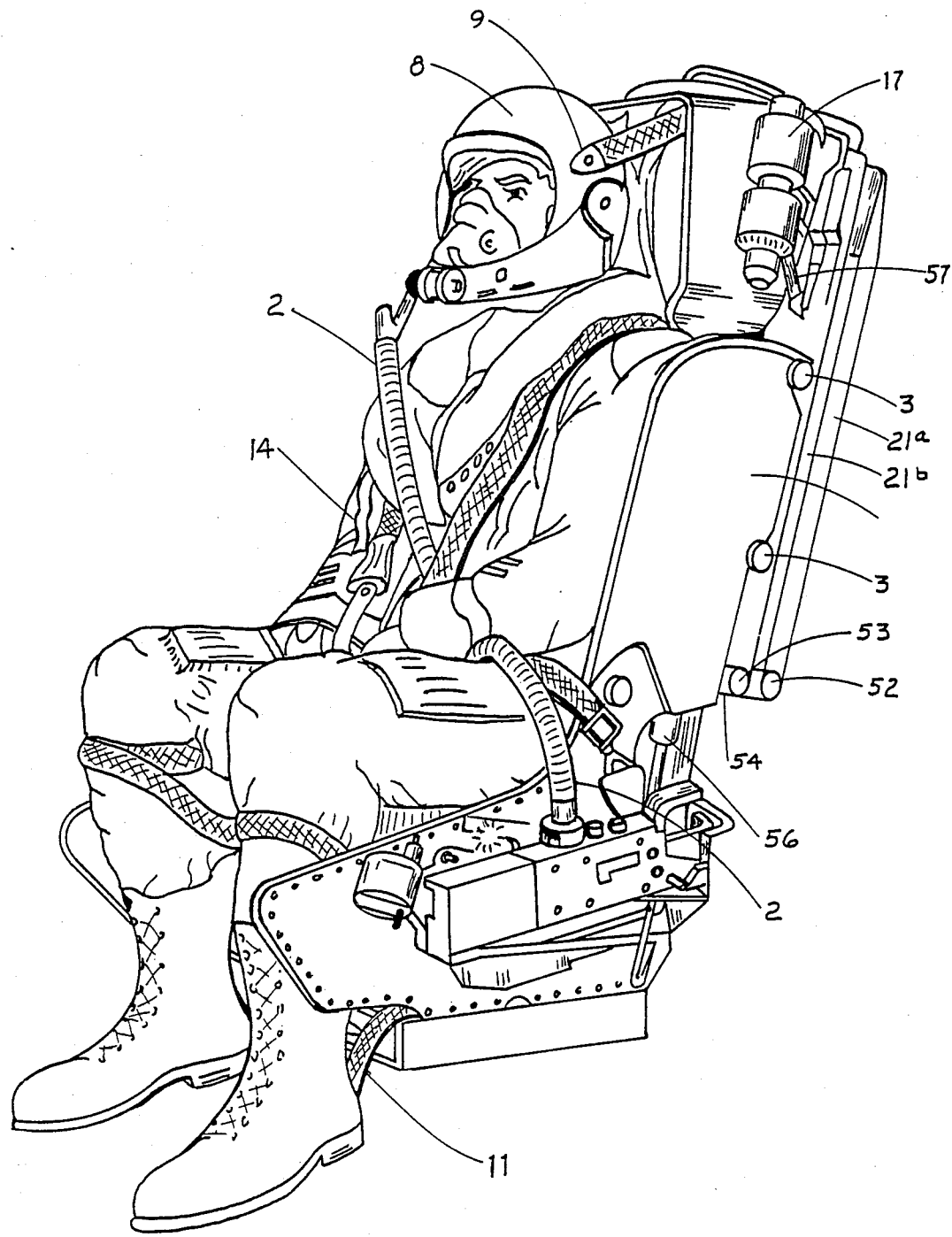
FIG. 14 is a ¾ view of the flying seat as in FIG. 13 showing the crewman/ejectee in the seat as an occupant in the seat in an aircraft. Except for the add-on devices in FIG. 13, this is a current state-of-the-art ejection seat and ejectee configuration.

The integrated add-on flying means to the seat, this invention, has added depth 15 in the seat bucket and in the seat back 51 of the seat 1, FIGS. 1, 13, and 14 for stowage of the wings 21 and empennage 19. The powerplants 17 and 18 in FIG. 3 are small enough to be stowed and folded into the headrest. This unique small size of the jet powerplants for utilization of available stowing space and folded into the headrest is made possible by dividing the powerplants into two small individual units, an important teaching of this invention.

The wings 21 are supported by articulated structural tubular members 52 and 53 on pivotal axes 54 structurally attaching the wings 21 to the seat 1 assembly allowing the wings 21 a and b to deploy outwardly when the seat 1 deploys into a flyable aircraft during seat ejection, shown in FIGS. 4, 5, 6, and 8.

Figure 6:
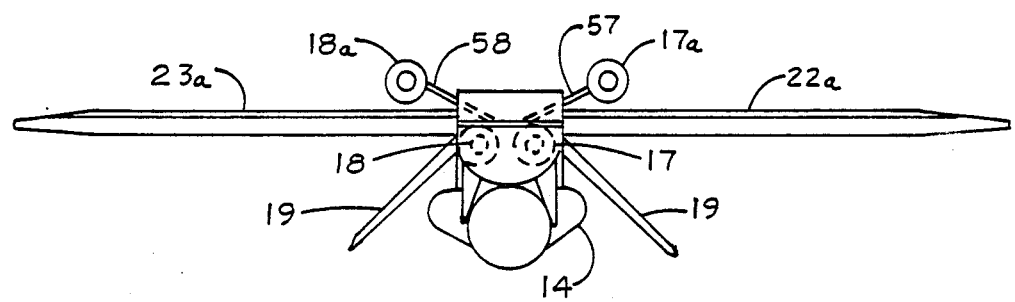
FIG. 6 is a front view of the deployed seat for flight taken on line 6—6 in FIG. 5.
Figure 4:
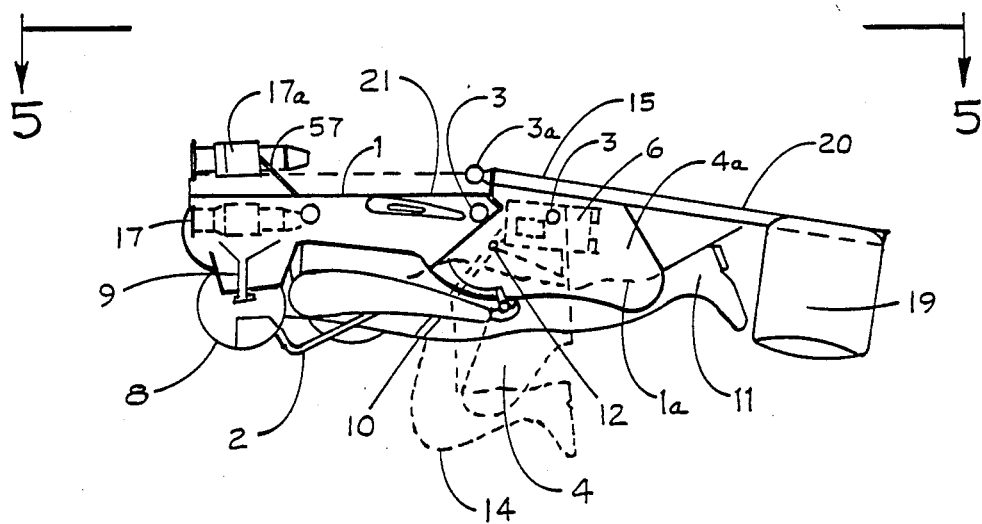
FIG. 4 is a side view of the seat showing the seat configured for flight after the seat is ejected from the aircraft, showing the wings deployed, the empennage deployed, the powerplants deployed, and the seat bucket stretched out and rotated aft to place the ejected crewman in a prone face downward in a horizontal attitude with respect to the seat back.
Figure 5:
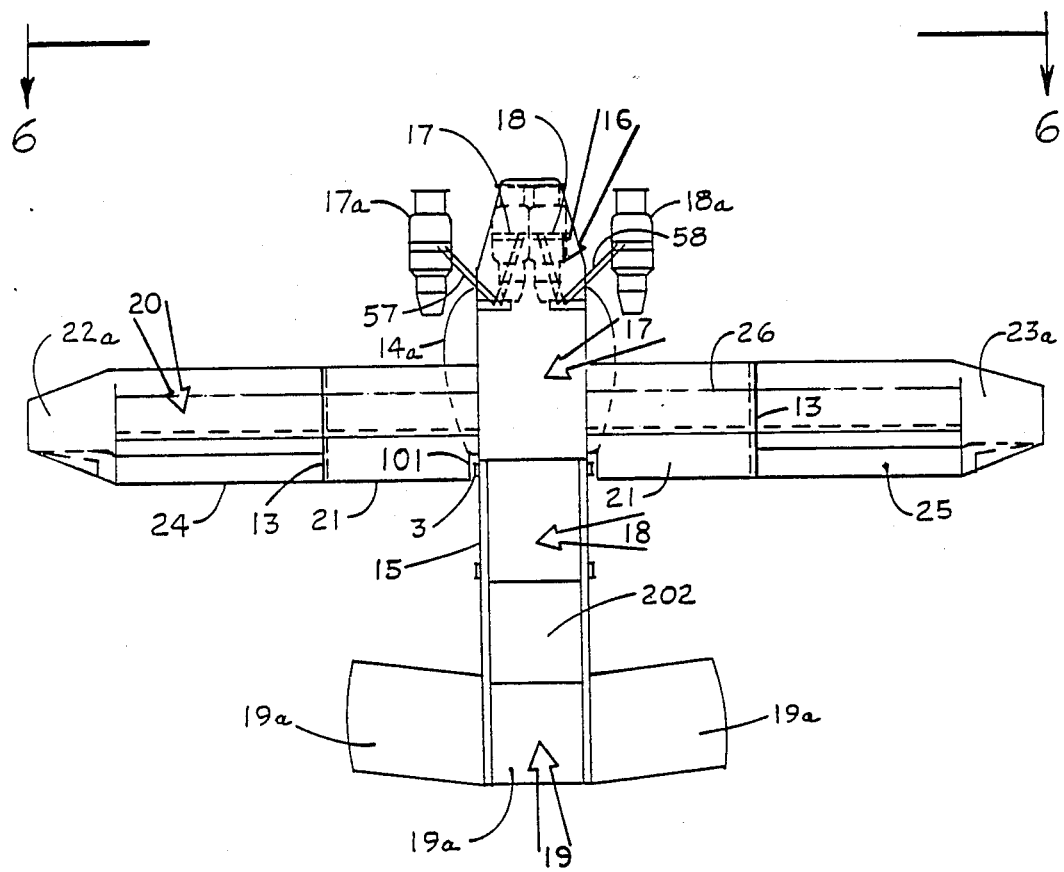
FIG. 5 is a plan view of the deployed seat for flight showing the empennage, wings, and powerplants taken on line 5—5 in FIG. 4.

The empennage 19 is stowed in the lower seat bucket extension 15 which comprises a device similar in concept to the office file drawer sliding tracks attaching to the empennage surfaces 19 and to the seat assembly 1 which with the lower seat bucket pivot 12 and seat bucket rotator 56 rotates the seat bucket 4 during deployment to the position in FIG. 4. This attitude resulting from aerodynamic means forces the seat into a prone attitude with the center of gravity below the center of aerodynamic drag. In this attitude of the seat bucket with empennage stowage 15 rotated to the top, the empennages 19 are slid aft on the file-drawer concept tracks and the empennages 19 are deployed in an aft tail configuration as shown in FIGS. 4, 5, and 6.

The powerplants 17, and 18 are stowed on associated folding members, 57 and 58, into the headrests of the seat 1 as shown in FIGS. 1, 2, 3, 17, and 18 by means of articulated extenders 57 and 58. When the ejection proceeds to position 40 in FIG. 8, the powerplants deploy by means of the articulated extenders 57 and 58 bringing the powerplants outboard beyond the seat 1 and above the wings 21 permitting the engines to start and produce thrust to propel the flying seat on its intended cross country cruise as shown in FIGS. 4, 5, 8 and 9.

As is found in the state-of-the-art conventional seat ejection system, the flying seat 1 is provided with track rollers 3 which mate with channel type tracks not shown secured within the aircraft for emergency seat ejection. These state-of-the-art type tracks in the aircraft provide an ejection guidance for the flying seat assembly 1 package when the seat is ejected from the disabled aircraft.

The seat assembly 1 comprises generally a state-of-the-art emergency ejection and survival seat system with a rocket/catapult ejectable seat 1, a parachute 7, an emergency survival water, land, and air kit 6, to which this invention adds wings 21 normally folded and stowed in the back of the seat 1, empennage tail 19 normally folded and stowed 15 within the seat 1 lower bucket 4, the lower pivoted seat bucket 4 having a device 15 with slidable file-cabinet type tracks to extend the empennage 19, with the lower seat bucket 4 also having a pivot axis of rotation 12 and a seat bucket rotator 56 to maintain seat bucket 4 normally in the upright sitting position when the seat 1 is in the aircraft prior to an emergency seat ejection and during ejection to sustain the ejectee's feet free of the rocket flamed during rocket burn.

Figure 7:
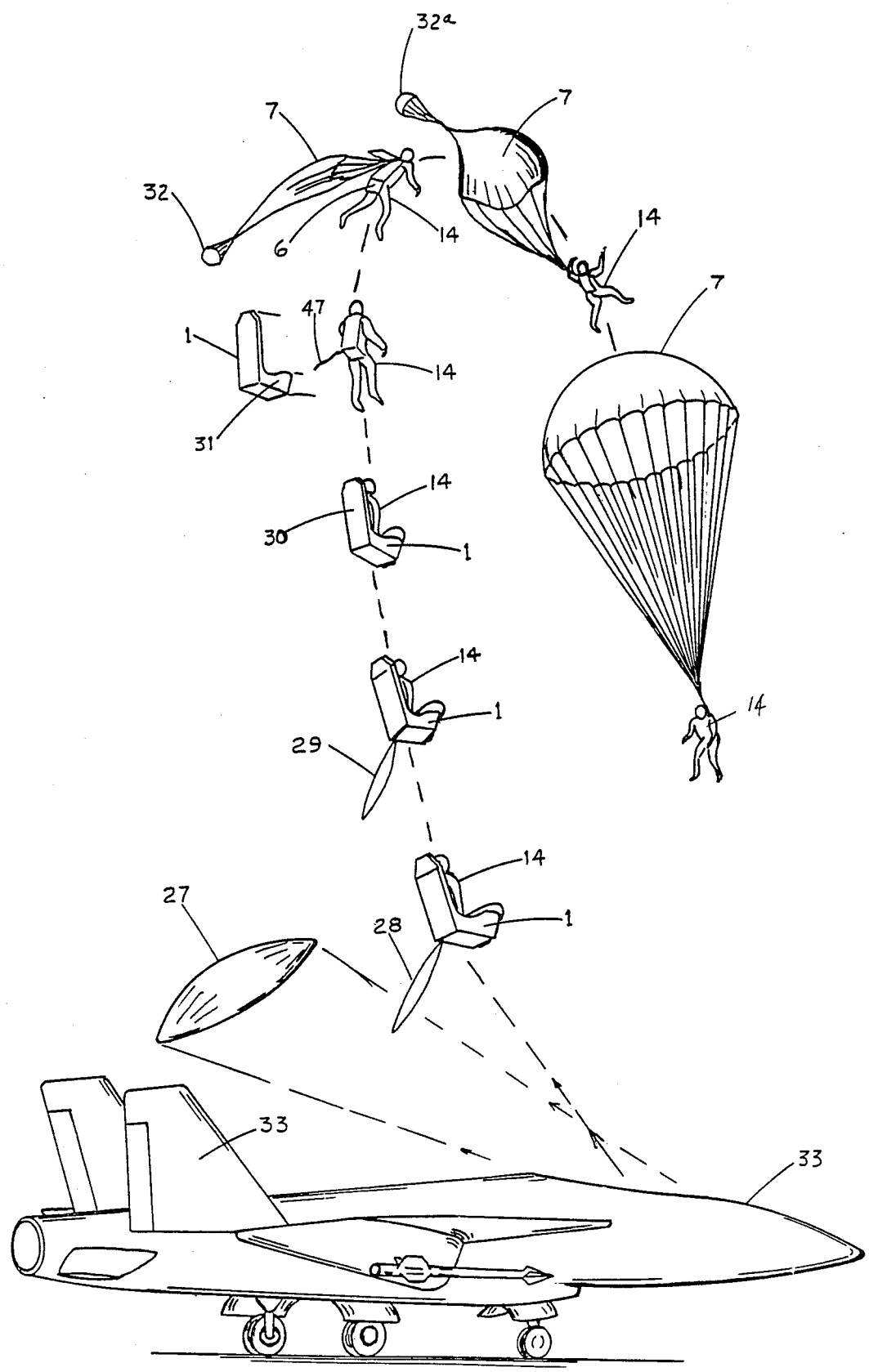
FIG. 7 is a side view of an aircraft with the ejectable flying seat being ejected in the zero airplane speed and zero altitude mode with separation of the crewman and the recovery of the crewman in the normal seat/parachute mode state-of-the-art seat and ejection sequences.
Figure 8:
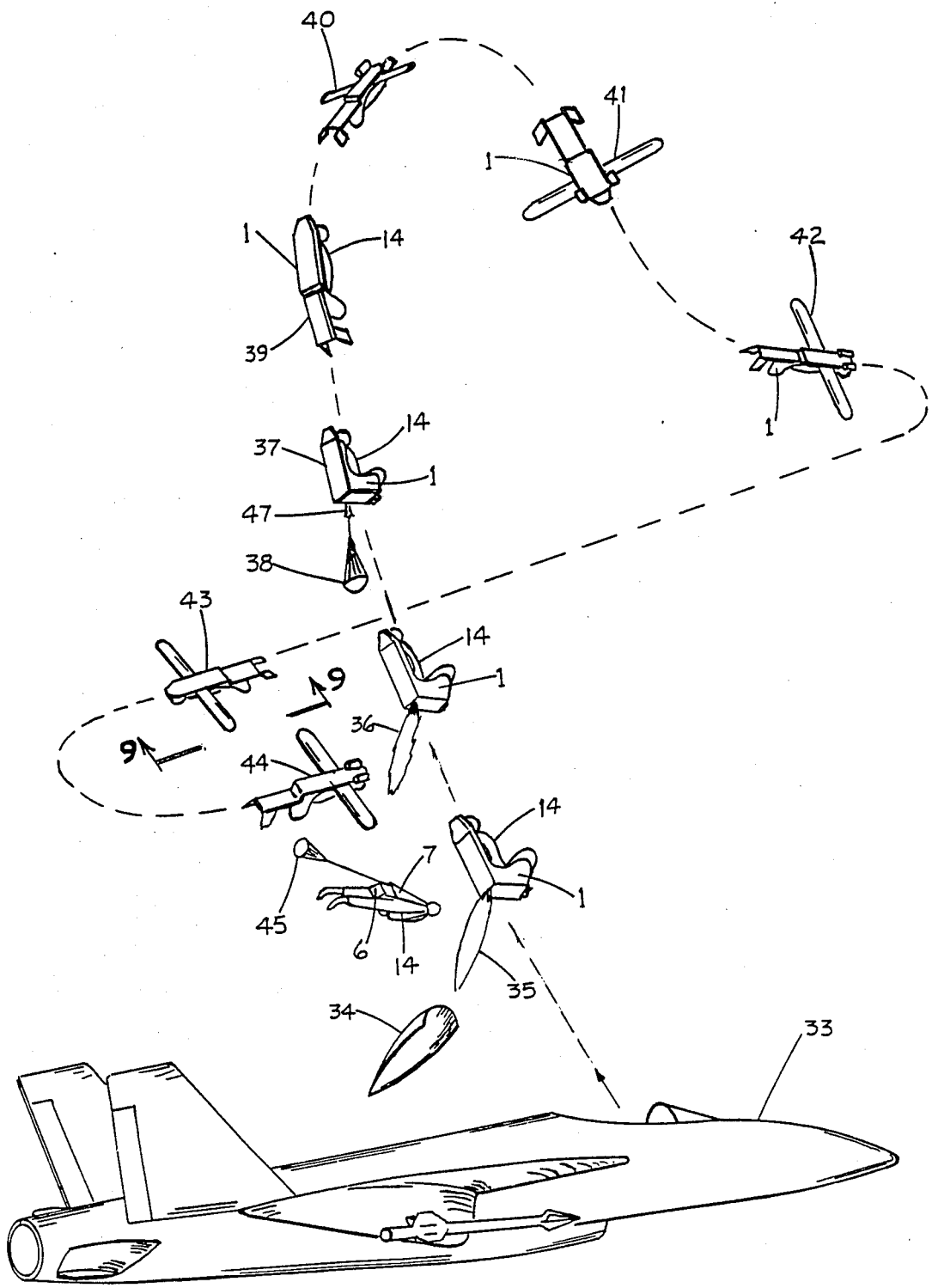
FIG. 8 is a side view of an aircraft with the ejectable flying seat being ejected during the aircraft high speed, high altitude flight mode showing the flying seat deploying into an aircraft with wings, empennage, and powerplants for crosscountry flying by the escapee, crewman ejectee.

The seat ejection system comprises two individual ejection modes: one a conventional state-of-the-art zero altitude and zero speed and low altitude mode FIG. 7, and the second mode, new and added, a high altitude, and a high speed ejection mode, FIG. 8.

In the zero-zero ejection mode FIG. 7, the seat duplicates the current state-of-the-art seat ejection. To this seat is added the stowed empennage 19 in the device 15, wings 21, and jet powerplants 17 and 18, and as shown in FIGS. 1, 2, 3, 7, 13, and 14 as the seat deploys, which are not deployed in mode one.

The high altitude high speed mode of ejection is shown in FIG. 8 in which the seat 1 converts to a small air-worthy and navigable airplane shown at the top of the seat ejection trajectory 40 and 41, FIG. 8. The seat 1 extends the tail empennage 19 following the separation of the rocket catapult 47 by means of the drogue chute 38 in FIG. 8 after rocket burnout. This follows the rotation of the seat bucket 4 on pivot axis 12 rotated by the seat bucket rotator 56 in FIG. 13, which then follows with extension of the wings on 52 axes & 54 in FIGS. 13 and 14, and is again followed by extension of powerplants 17 and 18 by means of articulated powerplant extenders 57 and 58 in FIGS. 4, 5, 6, 13, and 14. The flying seat is then in the flight configuration of positions 41 and 42 in FIG. 8.

The seat configuration for flight is shown in FIGS. 4, 5, and 6 which the flying seat automatically attains in position 41 in FIG. 8 when it reaches that position of the trajectory during seat ejection. At this position the ejectee airman can take full navigation control of his flying seat. The ejectee directs the seat to the position 42 for cross country escape flight to position 43 when the ejectee initiates separation of the flying seat in FIG. 8 for position 44 where the flying seat has separated from the ejectee. This flying seat invention separates from the ejectee similarly by means of the current state-of-the-art seat separation means including separation of the head restraints and shoe restraints. The shoe restraints are state-of-the-art used on the F-104, and in the early space shuttle flights.

After the flying seat separation reaches position 44 in FIG. 8 the recovery sequence of the ejectee 14 duplicates the current state-of-the-art recovery from the non-flying ejection seat and ejectee separation. The pilot chute 45 deploys and extracts the main survival parachute 7 in FIG. 8. This may occur in close proximity to a rescue helicopter for mid-air recovery rescue using an extendable hook from the helicopter to snare the personnel parachute in midair, or the ejectee may land on the ground as in FIG. 7.

Figure 9:
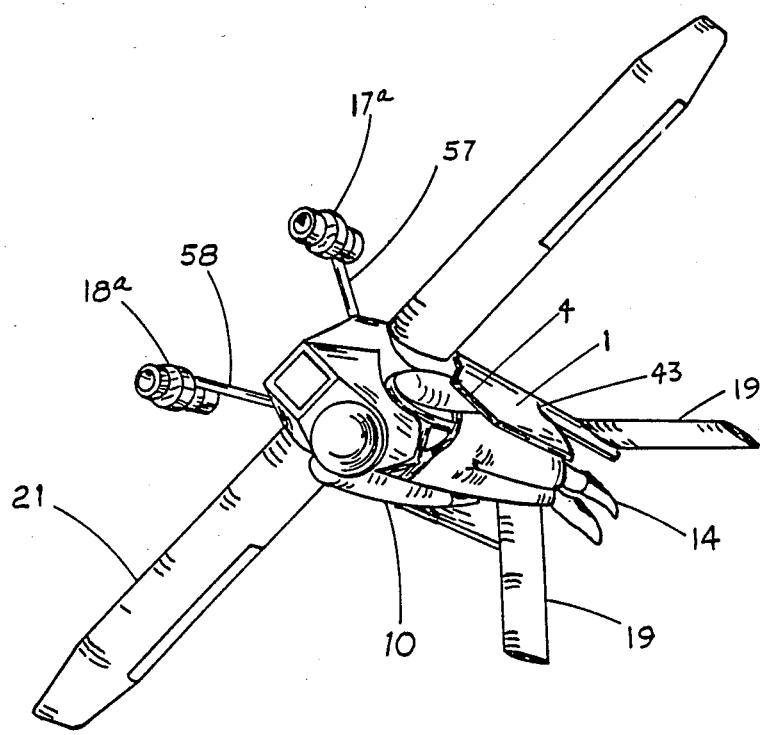
FIG. 9 is a view taken on line 9—9 in FIG. 8 showing a ¾ upward view of the ejectee crewman in the flying seat in the cruising cross country flight attitude.
Figure 10:
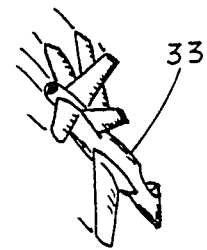
FIG. 10 shows the falling abandoned airplane after the flying seat/ejectee crewman has ejected with the seat deployed in the cross country flight mode.

FIG. 9 shows the flying seat 1 fully deployed in flight with the ejectee airman in a prone position supported in the flying seat 1 by means of shoulder and lap belts 10, foot restraints 11, and head restraints 9. The jet powerplants in positions 17a and 18a are deployed high and outboard from the headrest and above the wings 21. The seat bucket 4 at 39 is rotated about pivot 12 to place by aerodynamic action and favorable C. G. location the ejectee airman in the prone configuration head forward, face downward. The abandoned aircraft 33 in FIG. 10 is in a terminal descent to a crash.

Position 44 shows in FIG. 8 after the ejectee airman 14 has separated from the flying seat assembly 1. This now abandoned seat assembly crashes to the ground. It has completely served its usefulness.

In FIG. 12 the ejectee airman has separated from the flying seat 1 by severing the head restraints 9, lap and shoulder harness 10, and the foot restraints 11. As the ejectee leaves the abandoned seat 1, the parachute is deployed by the lanyard 47 shown in FIG. 7 at position 31. This lanyard trips the parachute deployment as the flying seat 1 and ejectee airman 14 separate. This operation of separation of the flying seat 1 and ejectee 14 tripping the parachute deployment and the subsequent parachute deployment are state-of-the-art functions.

Following deployment of the parachute 7 in FIG. 14 the ejectee 14 may land in the water or on land or the ejectee 14 may be rescued in midair by a helicopter snaring the parachute 7 with a state-of-the-art hook means.

FIG. 12 shows the release of the ejectee 14 over land for landing on the land or for midair pick up by a rescue plane. When the personnel parachute 7 and pilot chute 45 are snared above by a hook, the parachutes deflate and the ejectee 14 has a straight line retrieval support to the rescue craft.

FLIGHT OPERATION OF THE FLYING SEAT

Aerodynamic flight control of the add-on flying seat is for a relative short duration and for a short distance after seat ejection and seat deployment configuration into a flying seat for the ejectee. As disclosed above and as illustrated in FIG. 8, control of flight by the ejectee in the flying seat about three axes (roll, pitch, and yaw) occurs only from position 41 in the ejection trajectory to the cross country flight separation position 43. Following that event the descent is automatic and is current military state-of-the-art descent by personal parachute with limited control by the ejectee. During the ejection trajectory in FIG. 8 from the aircraft 33 to the position 41 the flight path is prescheduled and automatically built into the flying seat controlled only by the direction of the flight of the distressed aircraft at the point of ejection 33 in FIG. 8.

Configuration of the integrated add-on flying seat to point 41 in FIG. 8 is automatically programmed and built into the ejection system by means already existing in the state-of-the-art ejection seats of which the flying seat components are an integrated added-on improvement.

The flying seat has two modes of ejection as described above and illustrated in FIGS. 7 and 8, FIG. 7 being the current state-of-the-art ejection seat mode and FIG. 8 illustrating the integrated added-on improvement second mode (this invention) for high altitude and cross country escape and survivability.

Duiring the short interim of flight control of the flying seat, the control of the flying seat 1 is made as simple as possible. Control by the ejectee crewman is on two axes only, roll and pitch. The flying seat is therefore a so-called two-control aircraft used in a number of aircraft in the past and quite popular in general aviation before and immediately following World War II.

Two control is obtained in the wings only with the ailerons/elevons 24 and 25 control surfaces providing roll and pitch control of the flying seat in FIG. 5. Differential control of 24 and 25 provide roll control of the wings 21 and unidirectional control of the surfaces 24 and 25 provides pitch control of the seat. Rolling also provides yaw control.

The empennage tail 19 stabilizes the flying seat in the pitch axis and yaw axis permitting the flying seat to be controlled in three axes (roll, pitch, and yaw) similar to the conventional general aviation two-control aircraft. It has been discovered by the radio controlled flight with model airplanes that it is easier and simpler with two axis control giving the model in flight perfectly control maneuverability about three axes. This control means is the simplest for nonpilot operation of an aircraft.

The surfaces 24 and 25 in FIG. 5 have control means going inboard to each side of the seat bucket, 4a in FIG. 4 allowing the ejectee 14 to grasp the control for control of the surfaces 24 and 25 in FIG. 5. Left hand surface 24 is controlled by the ejectee's left hand and the right hand surface 25 is controlled by the ejectee's right hand. The wings 21 when extended for flight in FIGS. 4, 5, and 6 are fixed.

The ejection sequence in FIGS. 7 and 8 are current state-of-the-art sequences after the crewman 14 initiates the ejection, all sequences follow automatically. The crewman at ejection initiation has a choice of selecting mode one, the normal state-of-the-art ejection as shown in FIG. 7 of this invention, or mode two as in FIG. 8, in which the seat at the height of the trajectory configures into an airplane configuration for cross country flight.

In FIG. 7, state-of-the-art ejection, the airplane is at zero altitude and zero speed and it will land the escapee by parachute near the sight of the accident. The seat is initiated for the normal state-of-the-art ejection with the airplane 33 on the ground and stationary.

The sequence of events follows in the current state-of-the-art military seat ejection. The canopy 27 ejects followed by the seat ejecting with full rocket thrust at 28. At 29, the rocket thrust is diminished and the rocket is burning out. At 30, the seat is coasting on its momentum acquired during rocket thrust. At 31 the seat separates from the crewman 14 by state-of-the-art seat separation means and the lanyard 47 between seat 1 and ejectee 14 initiates parachute deployment shown in 32 with pilot chute actuation. The following position shows parachute 7 partially inflated at the top of the trajectory, and the following position shows the ejectee 14 and parachute 7 in the descent to the ground.

In FIG. 8 the airplane 33 is in flight and at high altitude where the crewman 14 ejectee desires cross country escape from the scene where the airplane was abandoned.

The crewman at ejection initiation selects the second mode of ejection, which in this instance is the selection for cross country flight.

In FIG. 8, as in FIG. 7, the first sequence following initiation is current military state-of-the-art ejection of the canopy 34. The position 35 shows the seat rocket in full thrust. In 36 the rocket thrust has reduced with the rocket burning out as in FIG. 7. At 37 the seat 1 is coasting and the burned out rocket 47 is extracted by the drogue parachute 38.

At position 39 the seat bucket 4 rotates aft to place the ejectee 14 in a prone, face downward, head forward configuration, for deployment of the empennage 19 from container 15 which is beginning. At position 40 the wings 21 and powerplants 17 and 18 deploy, with the deployment of the wings completed at 41. In position 42 the ejectee 14 has full flight control of the flying seat for an extended cruise across country to safety in a hostile ground environment.

After a cruise across country to position 43 in FIG. 8 the ejectee 14 chooses to separate at 44 and at 45 the pilot chute deploys to deploy the main personnel parachute 7.

In FIG. 13 the wings 21 are folded and stowed in the seat 1 backrest. The empennage 19 folds and stows in the seat bucket below the seat. The powerplants 17 & 18 stow and fold into the headrest on articulated arms 57 and 58. The seat bucket 14 actuator on pivot 12 is actuated by actuator 56. The wings 21a and 21b are integrally attached to the seat 1 backrest through members 52 and 53.

In FIGS. 13 and 14 restraints 9 are on the crewman's helmet 8 and restrain the crewman ejectee's head when in flight, FIGS. 10 and 11. The shoulder harness 10 and lower lap belts 10 support the torso, and the lower restraints 11 support the ejectee's shoes in FIGS. 9 and 11. These restraints become severed when the ejectee separates in FIGS. 11 and 12.

The wings 21 in the area 51, FIGS. 13 and 14, available on the seat 1 backrest must be reduced in size to stow in the area 51 shown. The referrenced wings 21 are therefore expandable in the span indicated by the double line 13 in FIG. 5. The outer wing and inner wing telescope one within the other so that when the wing 21 is deployed the wing span is increased. The details of construction are disclosed along with actuation means in the second companion application of this invention.

The wing 21 airfoil chord is also increased beyond the seat 1 backrest width 51, stowed its folded and position, when the wing is deployed. The wing 21 airfoil chord also telescopes for wing stowage.

DESCRIPTION OF THE PREFERRED DETAILED CONSTRUCTION, SEAT EMBODIMENT, AND SEQUENCES OF MECHANICAL CONFIGURATION FOR FLIGHT DEPLOYMENT

As indicated in the fourth paragraph in the Background Of The Invention the second patent application discloses and claims the structural and detailed functional parts of this invention, comprising the new FIGS. 15 through FIG. 41. These Figures are described in detail in the second patent as this invention is too complex and too large to cover both the operational and structural inventions disclosed. These FIGS. 15 through 42 are included in this patent to illustrate the construction of the add-on features to the state-of-the-art ejection seat to make it a cross country escape vehicle for the escapee.

Figure 15:
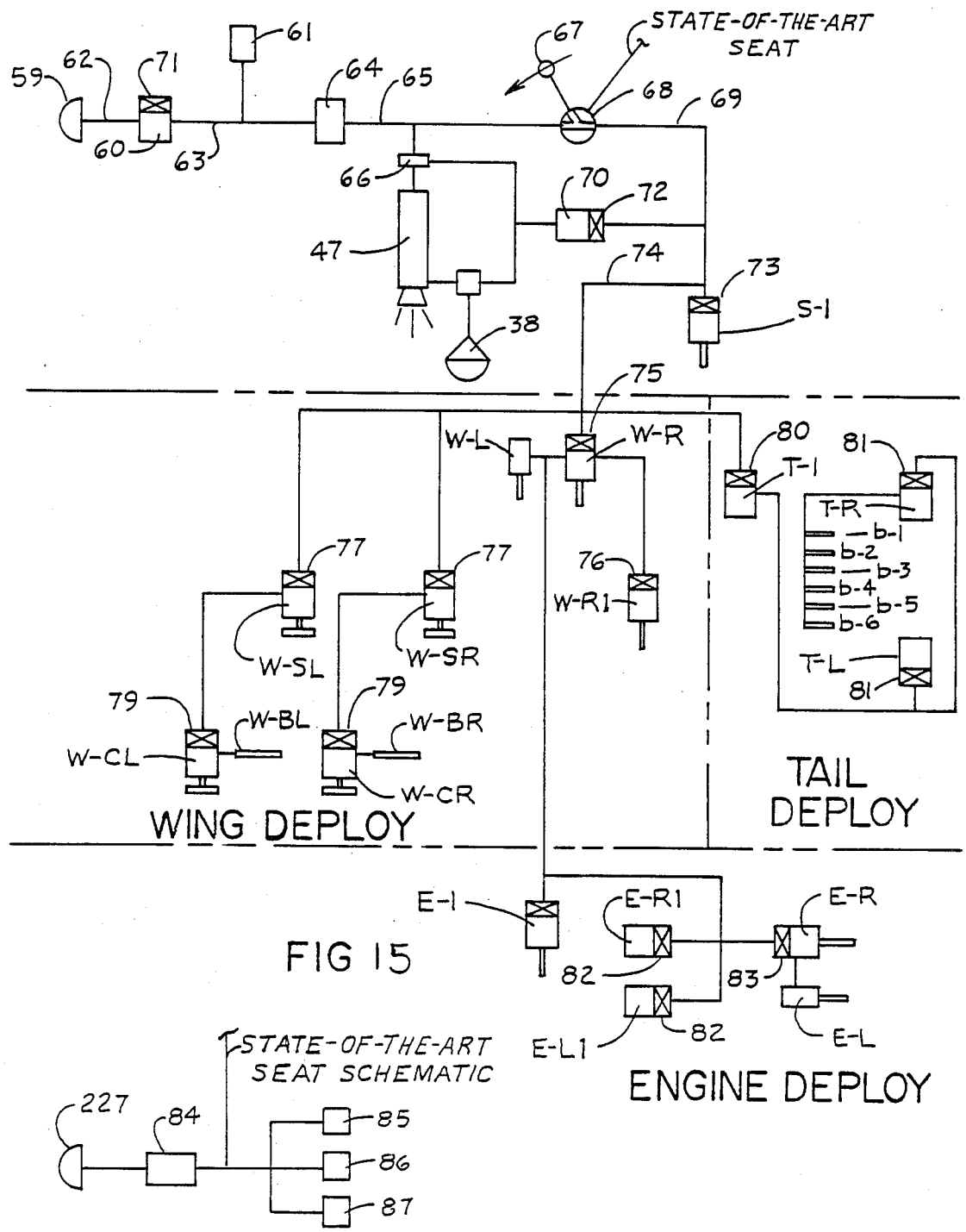
FIG. 15 is a schematic diagram identifying the pyrotechnic devices arranged in proper sequence to operationally deploy the flying seat into a controllable flight configuration for the emergency-in-flight ejectee cross country escape.

In FIG. 15 schematic diagram the functional components are state-of-the-art pyrotechnic initiators comprising explosive powder which controllably ignite and create a high pressure force within the hollow lines/tubing 62,63,65,69 74, etc. This explosive pressure provides the force to actuate the deployment of the wings, tail, and engines. All actuators and initiators exist as state-of-the-art components known to those skilled in the art of ejection seat deployment. These initiators comprising 60,70, S-1, W-R, T-1, T-L, T-R, W-SR, W-SL, W-CL, W-CR, E-R1, E-R, E-L1 are delay initiators 71, 72, 73, 75, 80, 81, 77, 79, and 83 which sequence, delay and time the functions of deployment of the wings, tail, and engine.

These functions as a group are selective by the ejectee by means of the manual control handle 67 which actuates the valve 68. From this valve 68 and beyond in the FIG. 15 the initiator system is added onto the present state-of-the-art ejection seat FIG. 7 to make the seat function as in FIG. 8 positions 38 through 43.

In FIG. 15 with the manual lever 67 and 68 valve in the positions shown, when the D-ring 59 is pulled by the ejectee the initiator 71 fires the device to arm the system and to fire initiator 61 which pulls in the shoulder harness 10 and head restraints 9, FIG. 13. This also fires the initiator 64 which pulls in the straps 11 connected to the ejectee's boots at the heel of the boot. This initiator also fires the rocket/catapult 47 which ejects the seat/man from the flight station FIG. 7 and 8. After rocket burnout the delay initiator 72 & 70 actuate the explosive bolts at 66 and eject the parachute 38 to remove the rocket/catapult 47 at position 38 in FIG. 8. While coasting to position 39 in FIG. 8 the initiator S-1, 73 actuates the seat pan 4 noted as actuator 56 in FIG. 13, to the stretch out attitude shown in FIG. 4.

Figure 18:
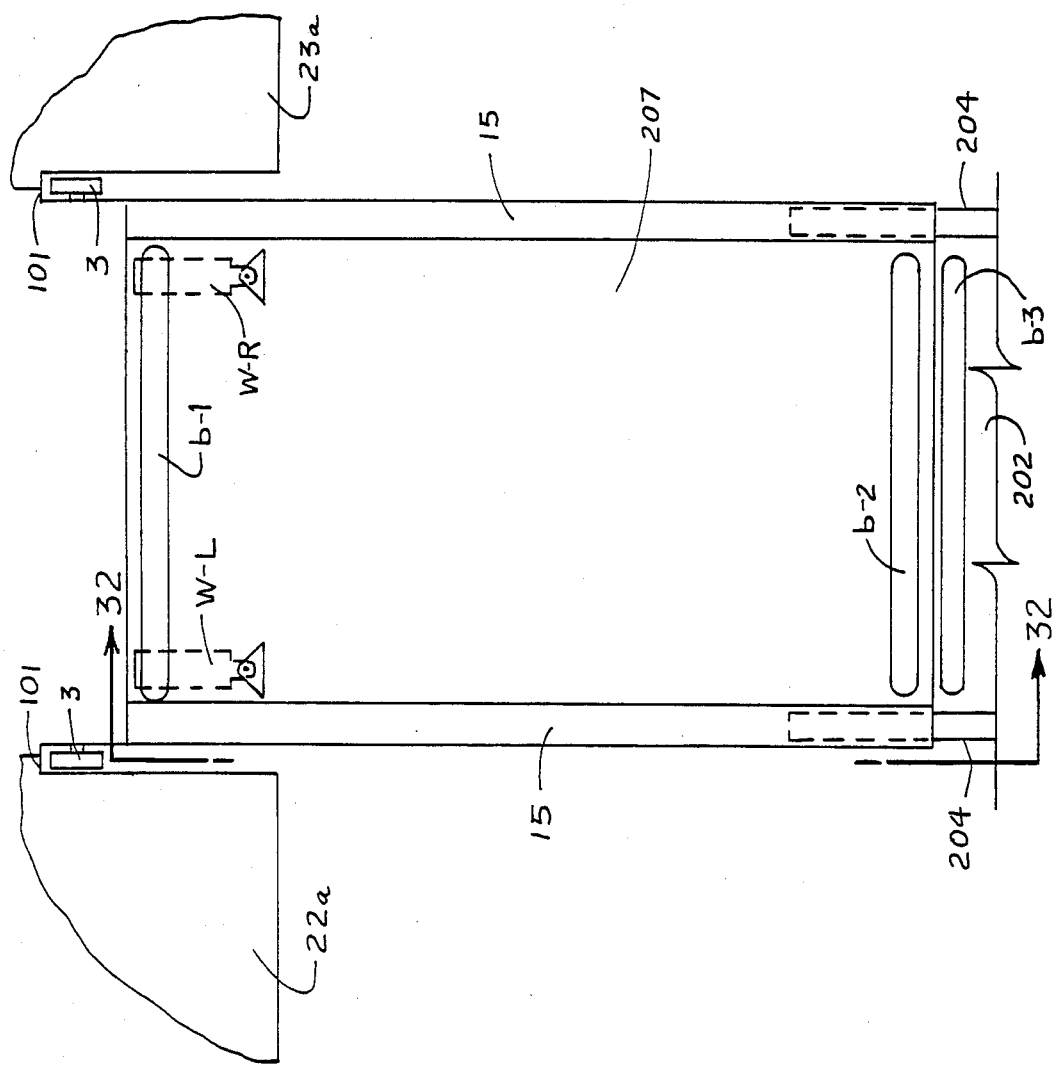
FIG. 18 is a fragmental section aft of the wings showing the empennage supports deployed taken at FIG. 18 in FIG. 5.
Figure 19:
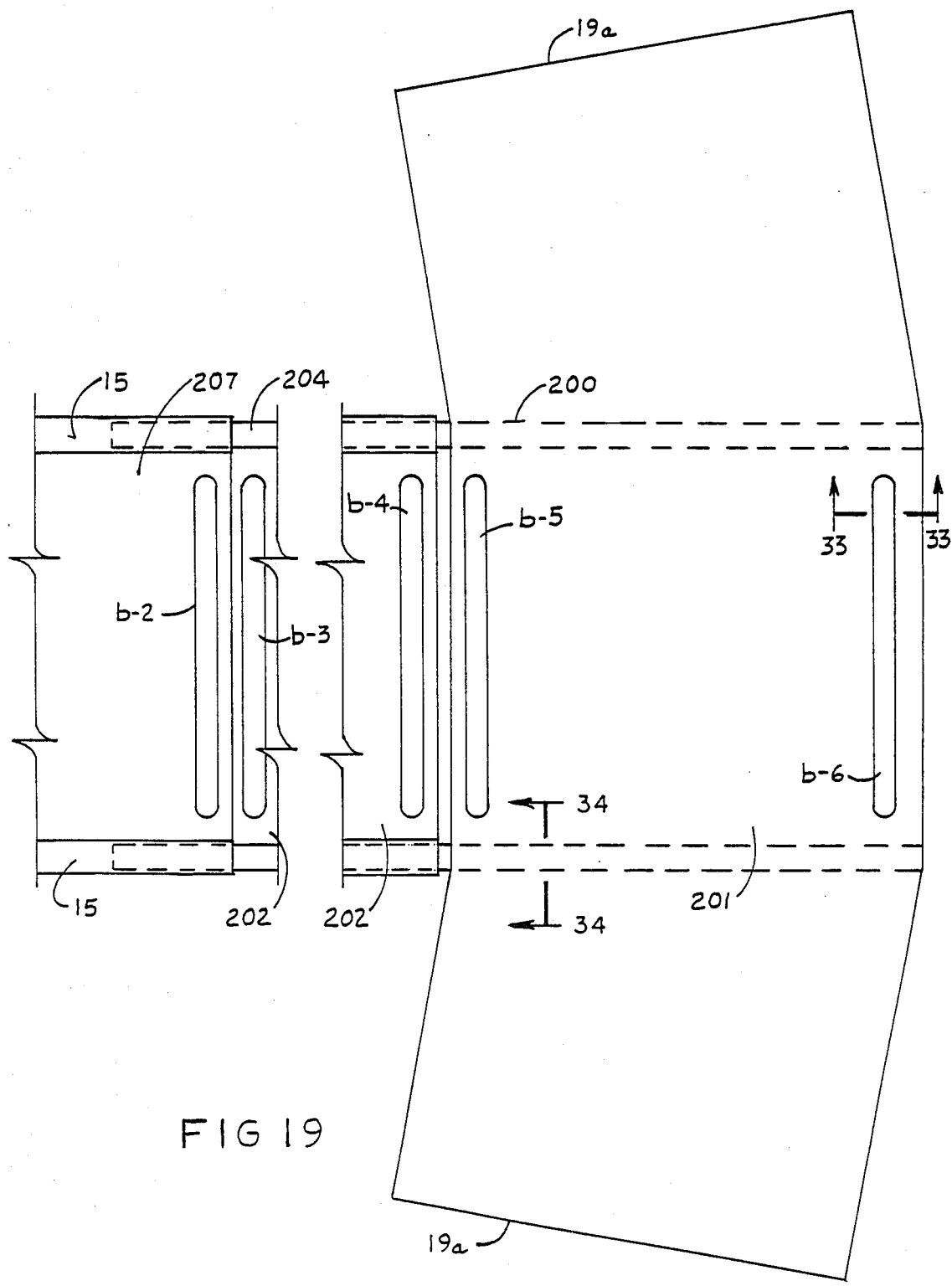
FIG. 19 comprises fragmental sections of the deployed empennage and the deployed empennage support structure taken at FIG. 19 in FIG. 5.
Figure 35:
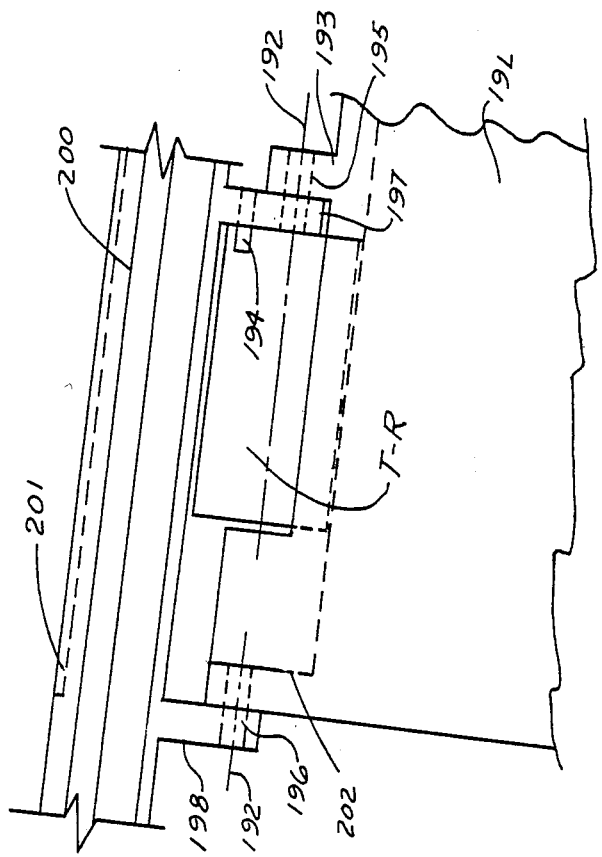
FIG. 35 is a section taken on line 34—34 in FIG. 17 identical to FIG. 34 with left hand empennage 19 deployed to 45 degrees which is shown in phantom lines 45° in the FIG. 34.
Figure 36:
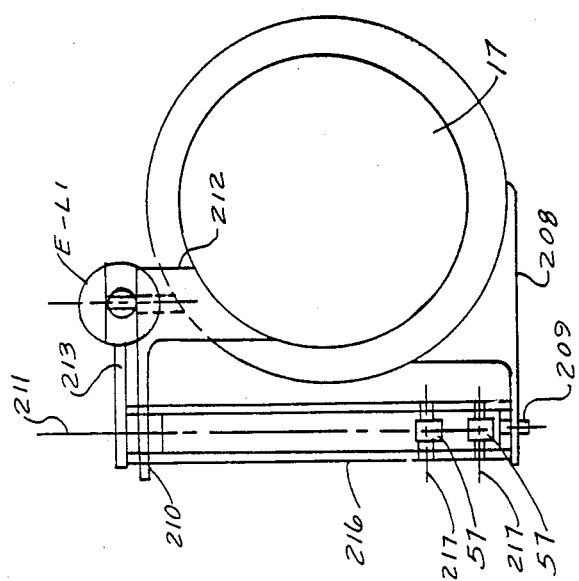
FIG. 36 is a section taken on line 36—36 in FIG. 34.
Figure 37:
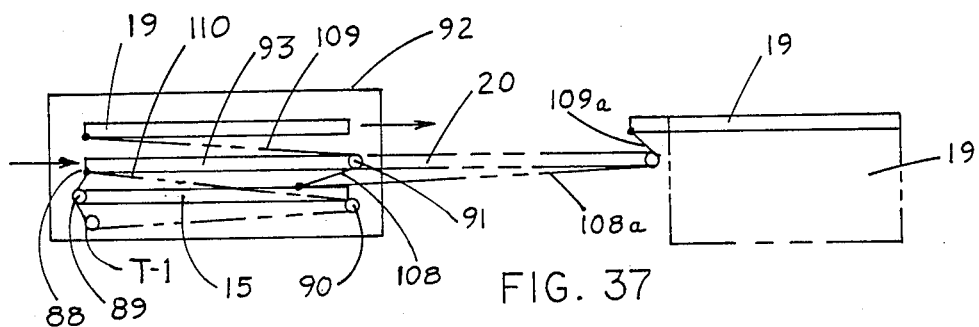
FIG. 37 is a section taken on line 37—37 in FIG. 29.
Figure 38:
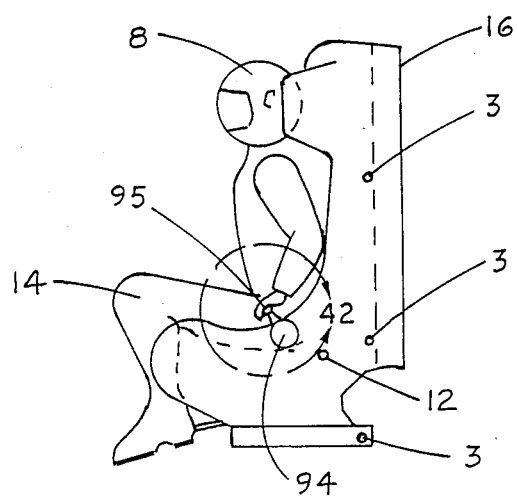
FIG. 38 is a schematic illustration of the extending and deployment of the empennage boom and empennage known as the tail.
Figure 42:
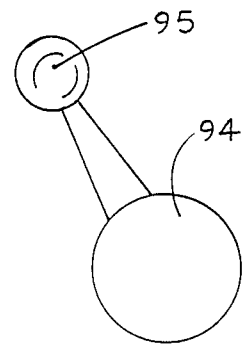
FIG. 42 is a section taken on line 42—42 in FIG. 24.

Following stretchout position of the seat pan 4 to 4a in FIG. 4, to place the ejectee in prone, head forward position, the tail boom is elongated as shown in FIGS. 18, and 19, shown also in FIG. 4, by actuator T-1, 80, and sequentially the empennages 19L and 19R are rotated on axis 192 as in FIG. 35 to positions 19aL and 19aR through initiator T-L, 81 on left 19L and T-R, 81 initiator on right 19R on the arc 189. The elongation of the tail boom is illustrated in FIG. 38 schematically where through a system of cables 109, and 110 also in FIG. 35 slide the empennage aft on file-drawer type slides 15, 204, and 200 on ball rollers 203 in FIGS. 34, and 32. The extended tail booms 15, 204, and 200 are locked in extended position by spring actuated locks 205 typically shown in FIGS. 34, and 32.

The side load forces on the tail booms 15, 204, and 200 are restrained by structural panels 207, 202, and 201. These panels are stiffened structurally by structural beads formed as shown in FIG. 33. These beads are formed by the pressure from initiator T- R which forms beads b-1, b-2, b-3, b-4, b-5, and b-6, shown in FIGS. 15, 18, 19, 32, and 34. These beads are formed by pressure inbetween a sectionally laminated sheet of metal 201 as shown in FIG. 33.

Figure 17:
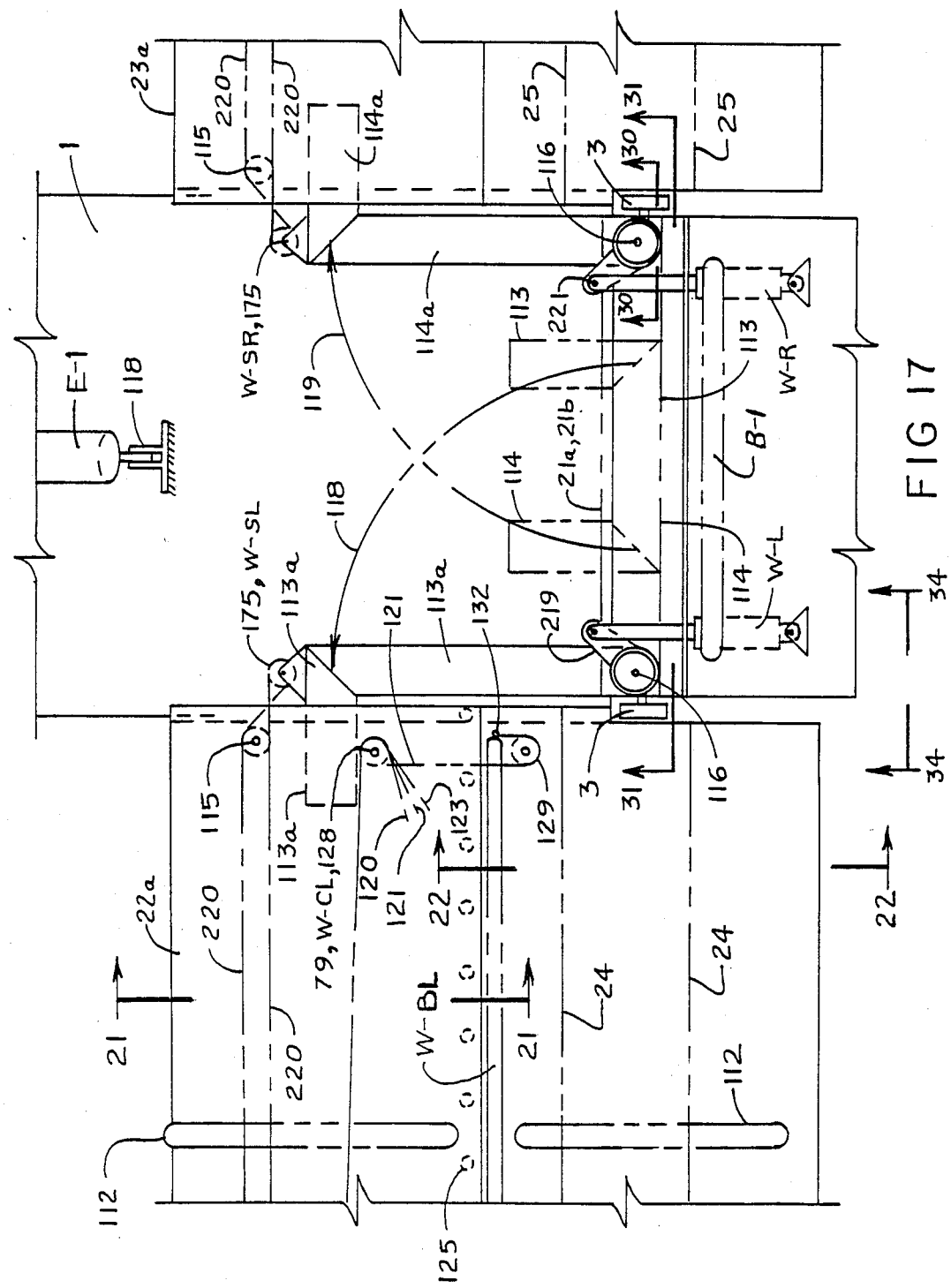
FIG. 17 is a fragmental section of the deployed wings at the center section of the seat taken at FIG. 17 in FIG. 5.

Following tail deployment in FIG. 17 is a view of the wing deployment function and structural integration with the state-of-the-art ejection seat 1. It is sequenced as the second function of deployment in the seat 1 configuration into a viable aircraft for ejectee cross-country escape. The wings 21a & b in the folded position are structurally attached to seat 1 by means of structural tubes 114 and 113 vertically in the stowed position. They are attached to the seat 1 at pivot axes 116 also shown in FIG. 31 with pivot axis 116 contained within a structural member 180 interconnecting seat 1 structure from L.H. to R.H. designed to carry the wing bending forces through the seat center. This structure is vertically below the fuel tank 190 containing the engine fuel 191. The tank 190 is fashioned to surround the rocket/catapult 47.

Figure 31:
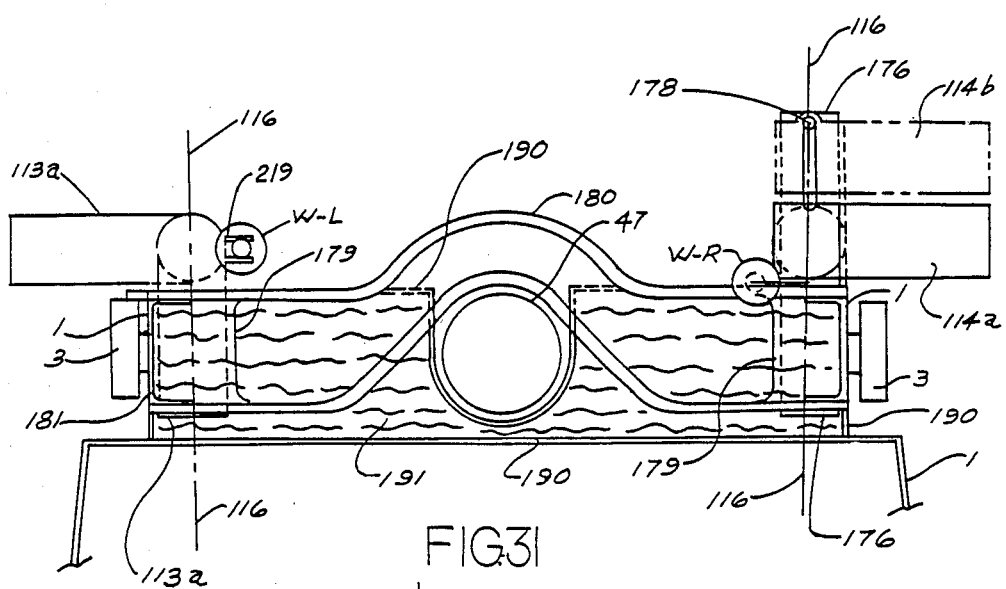
FIG. 31 is a section taken on line 31—31 in FIG. 17.

Shown also in FIGS. 17 and 31 are the actuators W-L and W-R which rotate 113 and 114 about the axes 116 to positions 113a and 114b.

Figure 30:
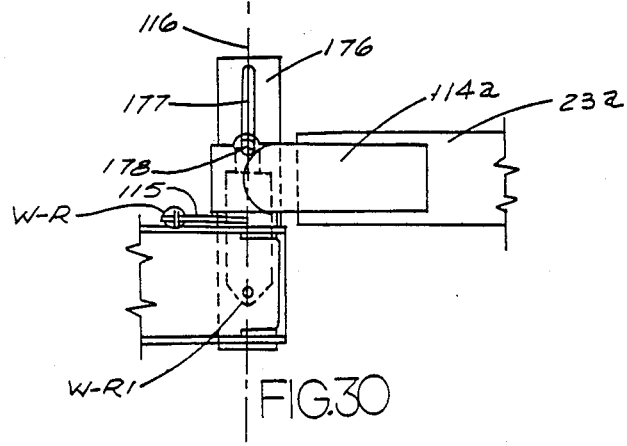
FIG. 30 is a section taken on line 30—30 in FIG. 17.

Actuator W-R1 in FIG. 30 moves 114b in FIG. 31 to 114a in FIG. 30. The wings 22a and 23a in FIG. 17 now are on the same horizontal level.

Following this the wings 22a and 23a are extended in span. Before extension in span the collapsed wings are as shown in FIGS. 21 and 22 with the outer wing skin panels 142 and 143 surrounding the inner skins 159 of the extendable outer wing panel skins 159 in FIGS. 23 and 24.

The outer span panels FIGS. 23 and 24 initially within the outside skin panels 142 and 143 of the inner span in FIGS. 21 and 22 are extended spanwise on spherical rollers 151 allowing the inner stationery spars 150 in FIG. 21 attached to 113a and 114a in FIG. 21 to remain stationary while the outer wing spars 153 and 152 in FIG. 23 are rolled outboard, spanwise on rollers 151 in FIG. 21. The extension of the wing span is motivated by cables 220 which are terminally anchored at 137, FIG. 21, to the spar 153 at 123 in FIG. 23. These cables are driven by the rotary actuators and initiators W-SL, 77 and W-SR, 77, FIG. 15. These said rotary actuators grab cable serrations 220 at 175 and extend the outboard panel in FIGS. 23, 24, and 20 to the outboard 22a position in FIG. 20.

Figure 20:
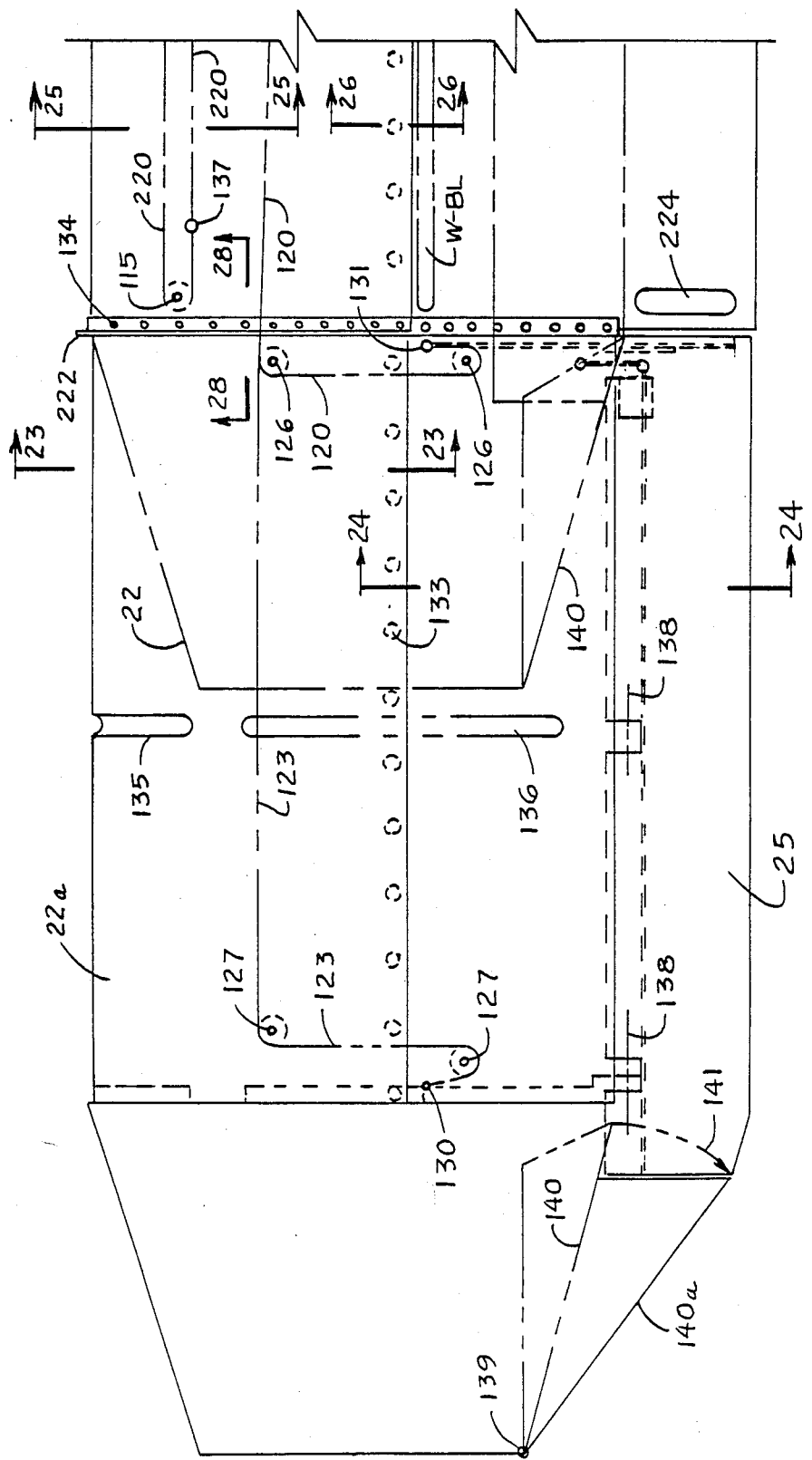
FIG. 20 is an outer wing panel fragment showing the wing deployment taken at FIG. 20 in FIG. 5.
Figure 29:
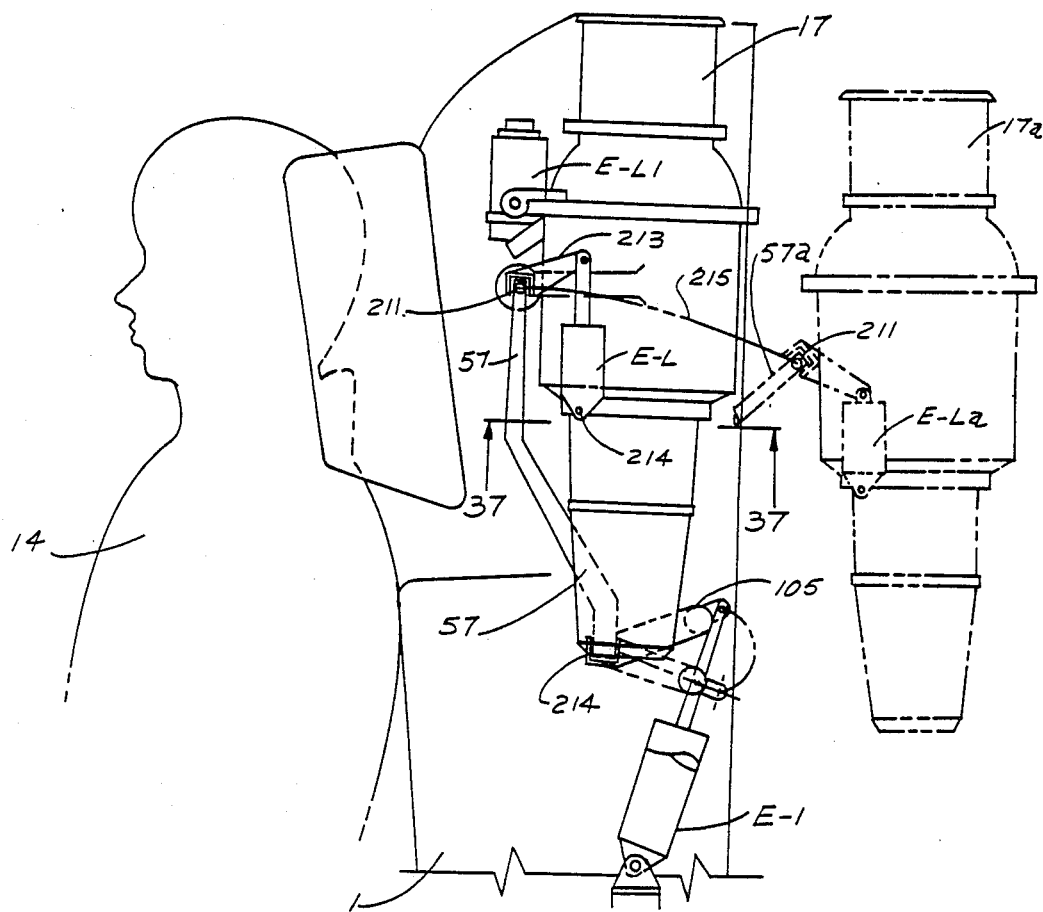
FIG. 29 is a view taken on the line 29—29 in FIG. 16.

When the outboard panel in FIG. 20 reaches the 22a extended position, spring loaded pins in FIG. 28 are forced into matching holes in angles 222 shown in FIGS. 20 and 28. This locks the outer panels into the extended position and transfers the wing lifting torque from the outer to the inner fixed wing panels in FIGS. 20 and 17.

In FIG. 25 as the outboard spans are extended and they progress outward, the pins 166 are forced into the matching holes at 166 in the stationary panel skins 142 by the springs 167 within the cavities 168 in the spar 150. These matching holes at 166 in 142 are uncovered and engaged with the pins 166 during the advance outward of the outboard panels as the span is extended. The torsional resistance integrity of the leading edge D section in FIG. 25 remains unaffected during the deployment.

When the span extension cycle is completed in FIGS. 15 and 20, by means of initiator actuators W-CL, 79 and W-CR, 79, the wing chord is lengthened as shown in FIGS. 23, 24, and 20, which is also indicated in FIGS. 21 and 22 where the inboard 143a envelopes 145a and 143a and the lower envelopes 158, although this cannot exist prior to the span extension. The wing chord is extended by the tracks 146 on spherical rollers 149, and mating stub tracks 163 structurally attached to the ribs 155 in FIGS. 22, 24, and 27. To the stub track is anchored cables 121, 127, and 120 in FIGS. 22, 24, 20, and 17 which are moved to extend the wing chord by the said initiator actuators W-CL, 79 and W-CR, 79. The main tracks 146 are anchored to spars 152, FIGS. 21 & 23.

To maintain torsional structural integrity of the trailing edge wing panels in FIGS. 17, 21, 23, and 20, the forward panel skins 142 and 159 engage the aft panel skins 143a and 145a as shown in FIG. 26. Skins 142 have hooks 170, 173 which drop into holes 172/171 to fully maintain, under tension from the chord extension, the structural continuity of the forward skins 142 and 143a. This structural continuity is repeated at the joining of the top and bottom forward skin panels with the aft top and bottom skin panels in the inboard fixed wing panels and the outboard extended panels in FIGS. 17 and 20.

The inner panels are stiffened by means of beads W-BL and W-BR in FIGS. 15 and 26. The beads are formed after the span and chord have been extended. They are internal on the wing skin panels, to avoid disturbing the wing lift, as shown in FIG. 26. To stiffen spanwise the inboard upper and lower skin panels 143a in FIGS. 21, 17, and 20, the beads 223 are formed in the sectionally laminated skins 143 through the pressures of the pyro system W-BL and W-BR in FIG. 15. The chordwise fixed integral beads 112, 135, 136, and 224 in FIGS. 17 and 20 stiffen the panels chordwise to maintain the integrity of the airfoil contour.

The chord extension is motivated by the said initiators W-CL, 79 and W-CR, 79 by means of said cables 123, 120, and 121. Integral with 128, triple drive pulley, is initiator 79, W-CL, shown schematically in FIG. 17 driving the powered terminal ends of cables 120, 121, and 123. Rotation of 128 moves the cable anchor points 132 in FIGS. 17, 131, and 130 in FIG. 20 to the points shown to expand the wing chord lengths as shown in FIGS. 17 and 20.

As the wing chord is extended in FIG. 20, the wing tip area is also increased from 140 to 140a by rotation at point 139 through arc 141.

The outer panels are comprised of a moveable aileron surface 24 and 25, FIGS. 5, 22, and 24, which moveably rotate about pitching axis 138, FIGS. 20, 22, and 24. The supports of the pitching axes are the fittings 225 attached to the rear auxiliary spars 226 in FIGS. 22 and 24.

Figure 39:
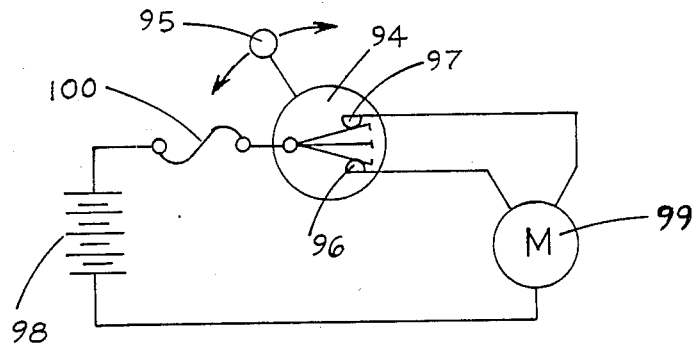
FIG. 39 shows the seat/man flight control lever.

The said ailerons 24 have an electrical drive motor M, 99 in FIG. 40. The said M, 99 motor is fixed to the aileron 24. Rotationally on the power output side, the pulley 165 has two cable terminal ends 162 anchored to the auxiliary spar 226. The motor circuit shows a double winding for two directional rotational power output. The direction of M, 99 output in FIGS. 39 and 40 is controlled by the direction of the pilot's handle 95 movement in FIG. 4. Electrical contact at 97 is aileron 24 up in FIGS. 39, 40, 22, and 24.

When the ailerons are moved upward with both pilot's controls L.H. and R.H. down on both left and right wings the craft descends. Likewise when the said controls L.H. and R.H. are moved oppositely simultaneously the craft ascends. While this may not be in agreement with normal control of aircraft this method of aircraft control has demonstrated to be viable in radio model aircraft flight. For roll control the pilot moves the left and right ailerons oppositely. The empennage remains fixed and causes the craft to point in the direction of flight which has also been demonstrated in the above said radio controlled flights.

The electrical schematic in FIG. 40 comprises two systems: an energy source battery 98, circuit breaker 100, two pilot's moveable control handles 95, two electrical switch contacts each 97 and 96, wiring, and two said two directional wound motors.

Figure 16:
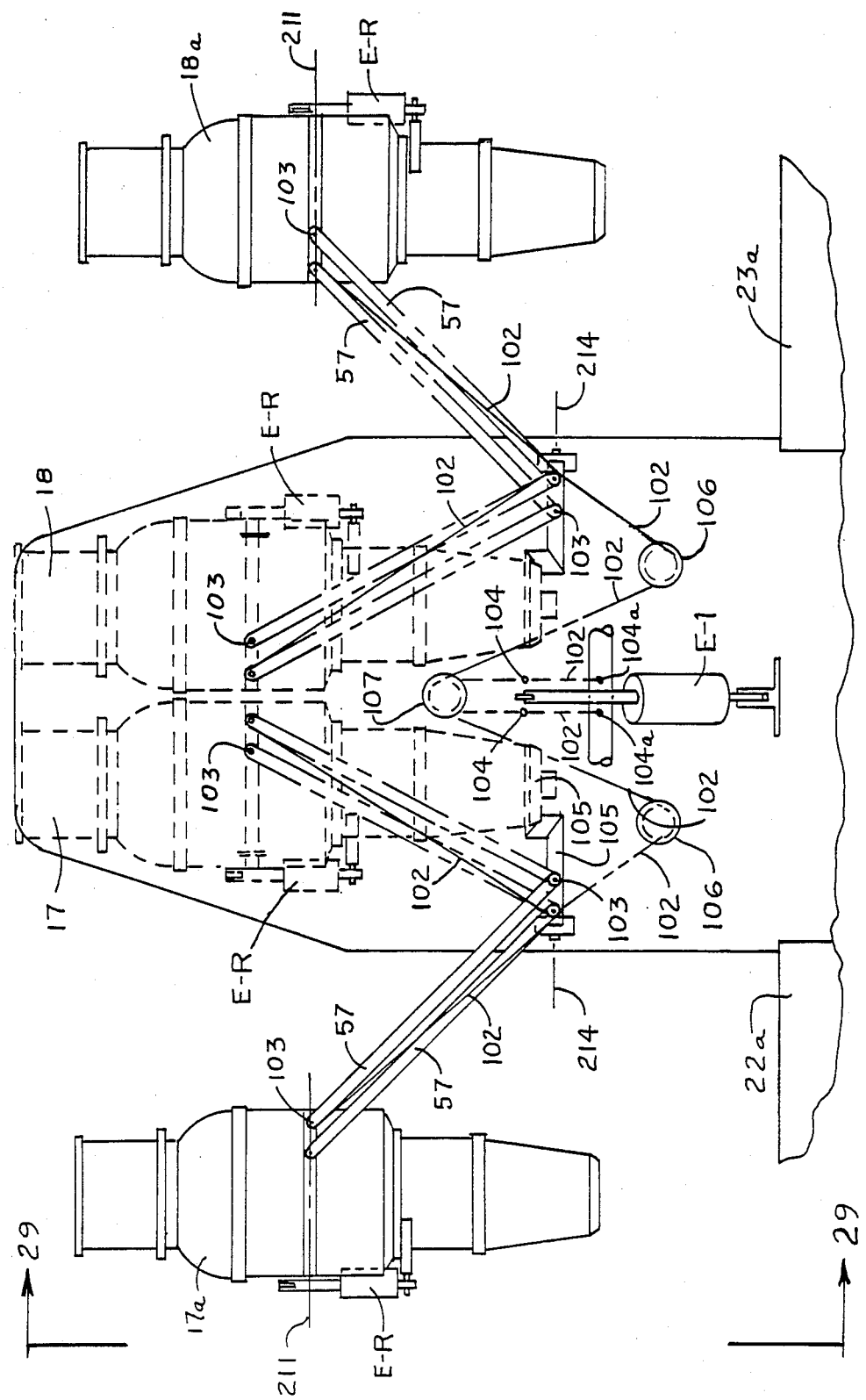
FIG. 16 is a detailed fragmental nose section of the deployed engines from the headrest section of the seat taken at FIG. 16 in FIG. 5.

Following wing deployment FIG. 16 discloses the engine's deployment actuation to the flight configuration in 17a and 18a. Stowed in the headrest are these engines in 17 and 18 positions. They are structurally supported by parallel members 57 pivotally attached to the seat 1 structure at 103 on a horizontally rotatable bar 105 on axis 214. This bar 105 is rotated from 104 to 104a by initiator E-1. During this sequenced initiator function the cables 102 terminals at 104 in moving of said bar from 104 to 104a the engines 17 & 18 move to positions 17a and 18a in FIG. 16, while in FIG. 29 the engines 17 and 18 are also elevated from the headrest stowage 17 & 18 to the flight positions 17a & 18a. The parallel members 57 are rotated on the arc 215 to position 59. In this position the said engines are sequenced again to rotate on axis 211 to the horizontal flight attitude by initiators E-L and E-R to position E-La. In this position the engines 17a and 18a are then started to produce the thrust for flight by the start initiator E-L1 and E-LR on each engine in proper sequence of deployment.

FIG. 41 shows the manual release D-ring handle 227 for release as shown in FIGS. 8, positions 44 and 45, and in FIGS. 11 and 12. The said D-ring release fires initiator 84 which actuates cutter 85, 86, and 87 to sever the head restraints 9, shoulder and lap supports 10, and boot connectors 11 in FIG. 13. In the automatic mode these releases are automatic in the state-of-the-art ejection in FIG. 7, position 31, which is indicated by the fragmented line to the state-of-the-art schematic.

What is claimed is:

1. A combination emergency ejection seat comprising two selective configuration modes for emergency escape from an aircraft prior to an impending crash, with mode 1 having means for zero speed and zero altitude escape comprising a current state-of-the-art emergency escape seat means, a conventional backrest means, a seat bottom means connected to the backrest means to support the airman in a vertical upright air transport, comfortable travel attitude, the seat bottom means having depth and means to accomodate an airman's emergency escape survival kit, personal parachute means integrated with the seat means for safe aerial recovery of the airman ejectee, state-of-the-art seat separation means to separate the ejectee from the ejectable seat and personal parachute deployment means associated with the seat means, rocket/catapult means to eject the seat means and threatened airman from the doomed aircraft, and in combination a selective mode 2 means comprising an articulated seat bucket means with hinge means supported by and integrated with the seat backrest means, actuating means to rotate the articulated seat bottom means to proximately a 180 degree stretch out aft of the ejectee's legs, torso, and body for minimum aerodynamic drag to configure into a sustained prone, head forward, face downward flight of the seat means with the ejectee airman.

2. An emergency ejectable escape combination seat means for two modes of emergency escape as in claim 1, in the second mode comprising extendable and foldable empennage means integrated within the articulated seat bottom means of the ejectable seat means for escape flight deployment to place and to sustain the seat means and ejectee by means of the aerodynamic forces into a "prone" attitude, head forward, face downward for cross country flight.

3. The combination of an ejectable emergency escape seat means for emergency escape selectively in two modes as in claim 1, comprising in the second mode extendable and foldable wing means integrated with the ejectable seat means and seat back means for inflight deployment for cross country flight of the ejectee in a sustained prone flight position, head forward and face downward of the seat back means with the ejectee.

4. The combination of an ejectable emergency escape seat means for emergency escape comprising selectively two modes as in claim 3, comprising in the second mode conventional wing aileron trailing edge aerodynamic control surface means hingedly secured to the trailing edge means of the folding wing means on the R.H. and L.H. wing means, when moved differentially to each other providing aerodynamic roll control means, and when moved in unison up and down to provide aerodynamic pitch control means to the flight of the ejectable emergency escape seat means.

5. The combination of an emergency ejectable seat means for emergency escape comprising selectively two modes of emergency escape as in claim 1, in the second mode the seat means comprising a head rest means, a powerplant means with folding and extendable articulated means associated with the powerplant means and head rest means for folding and extending the powerplant means within the head rest means and when extended to sustain the powerplant thrust means to fly the ejectable seat means in a cross country escape flight.

6. A combination of an emergency ejectable seat means for emergency escape comprising selectively two modes of escape from a doomed aircraft before an impending crash as in claim 1, in the second mode means comprising foldable wing means integrated with the ejectable seat back rest means for inflight deployment of the wing means for extended cross country flight of the ejectee's seat means in a sustained prone attitude, head forward with ejectee's face downward, control means on the wing means comprising aileron means with hingeable means connecting to the wings means for differential control in the roll control means, and in pitch control means of movement of the aileron means up and down in unison, foldable empennage means integrated with the seat bottom means folded into the said seat bottom for in flight deployment to sustain the ejectee and seat means through aerodynamic means in the prone attitude, with the head forward and face downward of the seat means and the ejectee, head rest means in the seat backrest means with powerplant means and folding articulated means associated and integrated with the head rest means and powerplant means for extending and folding the powerplant means in the head rest means, and for deployment in an extended position to sustain thrust means to fly the ejectable seat means to escape in cross country flight.

7. An aircraft seat for emergency escape ejection from an aircraft embodying two modes of ejection, mode 1 and mode 2, for an airman to escape an aircraft comprising in combination a state-of-the-art capability of a rocket/catapult seat ejection for zero speed and zero altitude ejection with the descent of the airman by personal parachute separated from the seat including in the second mode an add-on structural means capability to the said ejectable seat which comprises a seat back means, a seat bucket means, and a head rest means secured to the seat back means, rocket catapult means to eject the seat to configure the seat into an airplane configuration for high altitude escape and to escape inflight across the country from the scene of the aircraft accident comprising extendable and folding wing means on the backrest of the aircraft seat back means, rotatable seat bucket means, aerodynamic empennage means extendable and folded on the bottom of the seat bucket means, powerplant means extendable and folded into the headrest means, a seat bucket means with pivotal attaching means to and supported by the seat backrest with associated actuating means following seat ejection and rocket burnout to rotate the seat bucket downward to place the airman's head rest means forward and the seat back means to place the airman's body in a prone, face downward head to foot proximately 180 degrees stretch out configuration to provide aerodynamic means to place and maintain the seat in the prone position and to guide the seat in the said configuration.

8. A combination ejection seat as in claim 7 with the state-of-the-art rocket/catapult seat during the initial sequences of ejection parallel to the sequences of ejection in mode 1 until rocket burnout, means to separate the rocket/catapult from the seat, deployable aerodynamic means in the seat bucket means to place the airman's head forward and prone in a face downward, head forward prone configuration, deployment of the wing means and powerplant means to provide an airplane aerodynamically suitable for across the country flight for the escapee airman.

9. A combination ejection seat as in claim 8 with the ejection seat in an airplane aerodynamic flight configuration with the airman's head forward in a prone head and body face downward configuration having head restraint support means, shoulder harness support means, torso support and shoe support means to support the airman in prone flight, at termination of the cross country flight comprising state-of-the-art parachute means, including separation means of the head support restraints, shoulder harness and torso supports, and shoe supports with the airman descending by means of the personal parachute means separated from the flying seat.

10. In an aircraft an emergency ejection seat for escape from a disabled aircraft prior to an impending crash, a state-of-the-art escape system comprising a rocket catapult ejectable airman's seat means providing a personal parachute means for survivable airman air recovery, the seat means comprising the ejectee airman seat separation means, add-on improvement to the state-of-the-art seat means comprising extendable auxilary wing means for aerodynamic lift support of the seat in prone flight, seat bucket means having an articulatable pivot to rotate the seat bucket means downward to configure the ejectee into a prone, head forward, face downward position for cross country flight and for minimum aerodynamic drag, extendable powerplant means for thrust to propel the seat and wings in aerodynamic flight, deployable from the seat bucket empennage, tail means aft of the ejectee comprising aerodynamic surface means for aerodynamic prone guidance and stabilization of the seat in the prone head forward, face downward flight giving the ejectable flying seat configuration maximum range and maximum speed.

11. The improvement as defined in claim 10 comprising control in roll and pitch embodied in the wing means, the wing means supported on a horizontal structural means, means comprising an aerodynamic wing lifting area with aerodynamic control surface means on the trailing edges of the said wings to provide roll and pitch movement to control the flight direction of the flying seat up and down when the said control surface means are moved directionally up and down in unison, and to provide roll control when said control surface means are moved differentially.

12. The improvement in a flying seat as defined in claim 11 further comprising two extendable jet powerplant means joining a headrest means in the seat with said powerplant means on each side of the said flying seat having articulating support means joining the said powerplants to the headrest and allowing the said powerplants to extend and fold and to stow in the headrest within the boundary limit of the said flying seat.

13. The improvements in a flying seat as defined in claim 9 within the boundary limits of the seat back means a foldable and extendable for flight the above said wing means, and within the boundary limits of the seat bucket means a foldable, and deployable and aerodynamically responding empennage tail means.

14. The improvements in a flying seat as defined in claim 9 with said seat means having a backrest structure means for said wing means comprising a wing means extendable and folded span substantially equal to the height of the said backrest when stowed in the aircraft and being extendable to increase the wing span when the wing means are extended for flight.

15. The improvement in a flying seat as defined in claim 9 with the said seat means having a backrest structure with said wing means comprising a wing chord length substantially equivalent to the width of the said seat backrest means when stowed in the aircraft and wings having means of being expandable in the wing chord length when the wing means are deployed for flight.

16. The improvements in a flying seat as defined in claim 9 with the said airman seat having a seat backrest means, said seat backrest means comprising stowage means to contain the said wing means when stowed in the aircraft and structure means in the seat backrest to support the said wing when the wings are extended for flight.

17. The improvements in a flying seat as defined in claim 7 with the said airman seat means having stowage means in the said seat bucket means to stow the said empennage means when in the aircraft, and an extendable empennage means deployed into a tail configuration for flight when said seat bucket rotates the airman into a head forward face downward prone attitude.

18. In an emergency ejection seat construction for escape from a disabled aircraft prior to an impending crash, a state-of-the-art rocket/catapult ejectable airman seat having a parachute means for survivable ejectee airman air recovery, a current state-of-the-art seat separation means in the seat to separate the ejectee airman from the seat, the improvement comprisng a seat bucket means having an articulateable pivot means to rotate the seat bucket means downward and aft to configure the ejectee into a head forward, face downward prone attitude for prone flight for maximum speed and maximum range.

19. The improvements in a flying seat as defined in claim 9 comprising a seat headrest means comprising releasible restraint means to support the airman's head during flight of the flying seat when the said airman is in a prone face downward, head forward position.

* * * * *